(12) United States Patent
Wu

(10) Patent No.: US 12,554,813 B2
(45) Date of Patent: Feb. 17, 2026

(54) FACIAL EXPRESSION-BASED UNLOCKING METHOD AND APPARATUS, COMPUTER DEVICE, AND STORAGE MEDIUM

(71) Applicant: Tencent Technology (Shenzhen) Company Limited, Guangdong (CN)

(72) Inventor: Xuelei Wu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 545 days.

(21) Appl. No.: 17/893,028

(22) Filed: Aug. 22, 2022

(65) Prior Publication Data

US 2023/0100874 A1  Mar. 30, 2023

Related U.S. Application Data

(63) Continuation of application No. PCT/CN2021/108879, filed on Jul. 28, 2021.

(30) Foreign Application Priority Data

Sep. 3, 2020  (CN) .......................... 202010916138.1

(51) Int. Cl.
*G06F 21/32*  (2013.01)
*G06V 40/16*  (2022.01)
*G06V 40/20*  (2022.01)

(52) U.S. Cl.
CPC ............ *G06F 21/32* (2013.01); *G06V 40/171* (2022.01); *G06V 40/174* (2022.01); *G06V 40/28* (2022.01)

(58) Field of Classification Search
CPC .......... G06F 21/32; G06F 21/36; G06F 21/31; G06V 40/171; G06V 40/174; G06V 40/28
See application file for complete search history.

(56) References Cited

U.S. PATENT DOCUMENTS

| 6,950,949 | B1* | 9/2005 | Gilchrist | ................ G06F 21/44 726/19 |
| 7,363,585 | B1* | 4/2008 | Sierra | ................ G06F 3/04895 715/741 |

(Continued)

FOREIGN PATENT DOCUMENTS

| CN | 102509053 A | 6/2012 |
| CN | 106203038 A | 12/2016 |

(Continued)

OTHER PUBLICATIONS

Supplementary European Search Report issued Aug. 7, 2023 in Application No. 21863420.2 (7 pages).

(Continued)

*Primary Examiner* — John B King
(74) *Attorney, Agent, or Firm* — ArentFox Schiff LLP

(57) ABSTRACT

A facial expression-based unlocking method includes displaying an expression unlock page, and displaying an unlock node sequence on the expression unlock page. The method also includes creating, at a current unlock node in the unlock node sequence, an unlock status notification based on a facial expression in a facial image captured in real time, and completing unlocking based on the unlock status notification and a degree of match between the facial expression in the facial image and a corresponding target expression. Apparatus and non-transitory computer-readable storage medium counterpart embodiments are also contemplated.

20 Claims, 13 Drawing Sheets

(56) References Cited

U.S. PATENT DOCUMENTS

| | | | | |
|---|---|---|---|---|
| 8,370,926 | B1* | 2/2013 | Satish | G06F 21/36 726/19 |
| 10,606,994 | B2* | 3/2020 | Kurian | G06F 21/32 |
| 11,714,595 | B1* | 8/2023 | Libin | H04N 7/15 704/235 |
| 2004/0193943 | A1* | 9/2004 | Angelino | H04L 41/0631 714/4.1 |
| 2005/0257042 | A1* | 11/2005 | Sierra | G06F 9/45512 713/2 |
| 2006/0095785 | A1* | 5/2006 | White, Jr. | G06F 21/31 713/184 |
| 2006/0159312 | A1* | 7/2006 | Chiang | G06V 40/40 340/5.52 |
| 2008/0201578 | A1* | 8/2008 | Drake | G06F 21/36 713/172 |
| 2009/0158406 | A1* | 6/2009 | Jancula | G06F 21/46 726/5 |
| 2010/0222142 | A1* | 9/2010 | Mori | A63F 13/12 463/30 |
| 2011/0191838 | A1* | 8/2011 | Yanagihara | G06F 21/00 726/26 |
| 2011/0283353 | A1* | 11/2011 | Maetz | G06F 21/36 726/18 |
| 2012/0192268 | A1* | 7/2012 | Wang | G06F 21/36 726/19 |
| 2012/0304284 | A1* | 11/2012 | Johnson | G06F 21/36 726/19 |
| 2013/0063581 | A1* | 3/2013 | Komatsu | G06V 40/50 348/E7.085 |
| 2013/0191900 | A1* | 7/2013 | Ogawa | H04W 12/068 726/6 |
| 2013/0300650 | A1 | 11/2013 | Liu | |
| 2014/0013408 | A1* | 1/2014 | Ryu | H04W 12/06 726/7 |
| 2015/0248550 | A1* | 9/2015 | Alshinnawi | G06F 21/44 726/19 |
| 2015/0304303 | A1* | 10/2015 | Thibadeau, Sr. | G06F 3/04886 715/765 |
| 2016/0098553 | A1* | 4/2016 | Franke | G06F 21/36 726/19 |
| 2016/0132673 | A1* | 5/2016 | Birk | G06F 21/30 726/19 |
| 2016/0283708 | A1* | 9/2016 | Getchius | G06F 21/36 |
| 2016/0300048 | A1* | 10/2016 | Mason | G06F 21/31 |
| 2017/0243054 | A1 | 8/2017 | Lee et al. | |
| 2017/0324726 | A1* | 11/2017 | Alleaume | H04W 12/33 |
| 2018/0232561 | A1 | 8/2018 | Zheng et al. | |
| 2018/0260556 | A1* | 9/2018 | Avganim | G06F 21/78 |
| 2018/0373922 | A1 | 12/2018 | Yang et al. | |
| 2019/0114723 | A1* | 4/2019 | Tiwari | G06Q 30/04 |
| 2019/0122034 | A1 | 4/2019 | Chen | |
| 2019/0171886 | A1* | 6/2019 | Ashour | G06V 20/49 |
| 2019/0215695 | A1* | 7/2019 | Yang | H04L 9/3271 |
| 2020/0089938 | A1* | 3/2020 | Reznicek | G10L 15/08 |
| 2020/0342190 | A1* | 10/2020 | Li | G06K 7/10128 |
| 2021/0014218 | A1* | 1/2021 | Kurylko | H04L 9/3231 |
| 2021/0218568 | A1* | 7/2021 | Hernandez | H04L 9/0897 |
| 2023/0422027 | A1* | 12/2023 | Elshafie | H04L 63/06 |

FOREIGN PATENT DOCUMENTS

| | | | | |
|---|---|---|---|---|
| CN | 109165588 | A | | 1/2019 |
| CN | 109214301 | A | | 1/2019 |
| CN | 109325330 | A | | 2/2019 |
| CN | 109670285 | A | | 4/2019 |
| CN | 109829277 | A | | 5/2019 |
| CN | 110008673 | A * | 7/2019 | G06F 21/32 |
| CN | 110781488 | A * | 2/2020 | G06F 21/31 |
| CN | 111104660 | A | | 5/2020 |
| CN | 109753942 | B * | 11/2022 | |
| EP | 2746979 | A1 | | 6/2014 |
| KR | 20200061594 | A * | 6/2020 | G06F 21/31 |
| WO | WO-2006123899 | A1 * | 11/2006 | G06F 21/36 |
| WO | WO-2024162964 | A1 * | 8/2024 | G06F 21/31 |

OTHER PUBLICATIONS

Chinese Office Action issued Dec. 18, 2023 in Application No. 202010916138.1 (37 pages).

International Search Report issued Nov. 1, 2021 in International Application No. PCT/CN2021/108879 with English Translation (6 pages).

Search Report and Search opinion received for Singaporean Patent Application No. 11202252633H, mailed on Dec. 31, 2024, 13 pages.

* cited by examiner

FACIAL EXPRESSION-BASED UNLOCKING METHOD AND APPARATUS, COMPUTER DEVICE, AND STORAGE MEDIUM

RELATED APPLICATIONS

This application is a continuation of International Application No. PCT/CN2021/108879, filed on Jul. 28, 2021, which claims priority to Chinese Patent Application No. 202010916138.1, entitled "FACIAL EXPRESSION-BASED UNLOCKING METHOD AND APPARATUS, COMPUTER DEVICE, AND STORAGE MEDIUM" filed on Sep. 3, 2020. The entire disclosures of the prior applications are hereby incorporated by reference.

FIELD OF THE TECHNOLOGY

This application relates to the technical field of artificial intelligence, including a facial expression-based unlocking method and apparatus, a computer device, and a storage medium.

BACKGROUND OF THE DISCLOSURE

With the popularization of intelligent devices and the continuous development of information security, users have higher and higher requirements for information security. Therefore, the application of security locks, such as a device start-up password lock, an application login security lock, a payment password lock, and the like, is becoming more and more popular with users.

In a commonly used unlocking solution using a security lock, usually corresponding passwords are entered for unlocking, a fingerprint of a user is entered for unlocking, or human face recognition is performed by capturing a human face image for unlocking. For the unlocking using the human face recognition, a third party may perform unlocking by using a photo or a human face model, resulting in potential information security risks.

SUMMARY

According to various embodiments of this disclosure, provided are a facial expression-based unlocking method and apparatus, a computer device, and a storage medium.

In an embodiment, a facial expression-based unlocking method includes displaying an expression unlock page, and displaying an unlock node sequence on the expression unlock page. The method also includes creating, at a current unlock node in the unlock node sequence, an unlock status notification based on a facial expression in a facial image captured in real time, and completing unlocking based on the unlock status notification and a degree of match between the facial expression in the facial image and a corresponding target expression.

In an embodiment, a facial expression-based unlocking apparatus includes processing circuitry configured to display an expression unlock page, and display an unlock node sequence on the expression unlock page. The processing circuitry is also configured to create, at a current unlock node in the unlock node sequence, an unlock status notification based on a facial expression in a facial image captured in real time, and complete unlocking based on the unlock status notification and a degree of match between the facial expression in the facial image and a corresponding target expression.

In an embodiment, a non-transitory computer-readable storage medium stores a computer program, which, when executed by a processor, causes the processor to perform a facial expression-based unlocking method. The method includes displaying an expression unlock page, and displaying an unlock node sequence on the expression unlock page. The method also includes creating, at a current unlock node in the unlock node sequence, an unlock status notification based on a facial expression in a facial image captured in real time, and completing unlocking based on the unlock status notification and a degree of match between the facial expression in the facial image and a corresponding target expression.

Details of one or more embodiments of this disclosure are provided in the accompanying drawings and descriptions below. Other features and advantages of this disclosure become clearer from the specification, the accompanying drawings, and the claims.

DESCRIPTION OF EMBODIMENTS

This disclosure is further described in detail with reference to the accompanying drawings and embodiments. It is to be understood that the specific embodiments described herein are only used for explaining this disclosure, and are not used for limiting this disclosure.

Figure 1:
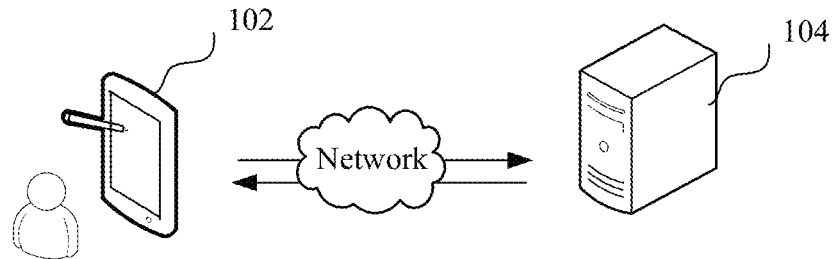
FIG. 1 is an application environment diagram of a facial expression-based unlocking method according to an embodiment.

The facial expression-based unlocking method provided by this disclosure may be applied to an application environment shown in FIG. 1. The application environment includes a terminal 102 and a server 104. The terminal 102 may capture a facial image of a to-be-tested object in real time through a built-in camera or an external camera, then recognize a facial expression of the facial image, and after recognition is completed, create an unlock status identification at a corresponding unlock node to prompt unlock status of the unlock node. After an unlock status identification is created at each unlock node in the unlock node sequence and a facial expression in each facial image matches a corresponding target expression, the entire unlock node sequence is successfully unlocked.

The to-be-tested object may refer to a to-be-tested user or another to-be-tested object (for example, an animal), and in a subsequent embodiment, a description is provided by an example in which a to-be-tested user is used as the to-be-tested object. The unlock node sequence may be regarded as a security lock having a plurality of passwords. Each unlock node corresponds to one password, which is decoded using a facial expression. The unlock status includes: a state in which no unlocking operation has been performed and a state in which an unlocking operation has been performed. The state in which the unlocking operation has been performed includes: a state in which the unlocking operation has been performed and the unlock node has been successfully unlocked and a state in which the unlocking operation has been performed but the unlock node has not been successfully unlocked.

In addition, the terminal 102 may also pre-enter an expression map of a target object, and different expression maps may be pre-entered for different unlock nodes (that is, corresponding to different target expressions), or a same expression map may be pre-entered for two or three different unlock nodes (that is, two or three different unlock nodes correspond to a same target expression). Each unlock node corresponds to one password, and the unlock node is unlocked (that is, decoded) using a corresponding facial expression. The expression map of the target object pre-entered by the terminal 102 may be stored locally or in the server 104. During an unlocking process, the server 104 compares a facial expression recognized from a facial image of the to-be-tested object with the stored expression map, to determine whether the facial expression of the to-be-tested object is consistent with the target expression of the target object.

The terminal 102 may be a smartphone, a tablet computer, a notebook computer, a desktop computer, a smart speaker, a smartwatch, or the like. In addition, the terminal 102 may also be an access control device, a gate, and the like, which is not limited herein.

The server 104 may be an independent physical server, or may be a physical server cluster including a plurality of physical servers, or may be a cloud server providing basic cloud computing services, such as a cloud server, a cloud database, cloud storage and a content delivery network (CDN).

The terminal 102 and the server 104 may be connected through a communication connection method such as Bluetooth, a Universal Serial Bus (USB), or a network, which is not limited in this disclosure.

Figure 2:
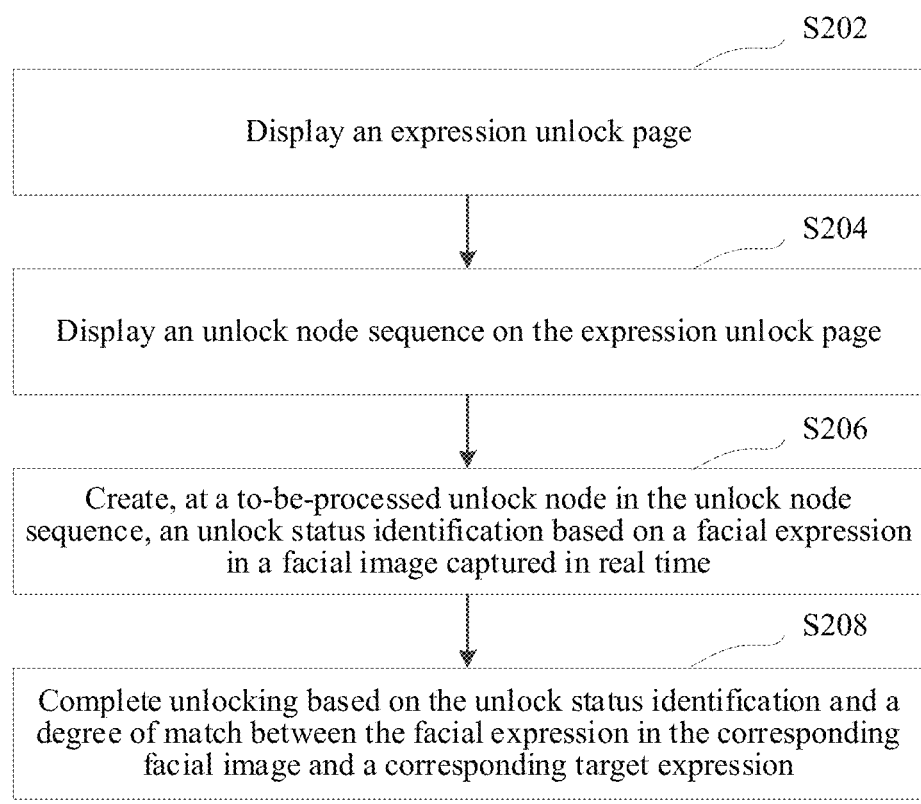
FIG. 2 is a schematic flowchart of a facial expression-based unlocking method according to an embodiment.

In an embodiment, as shown in FIG. 2, a facial expression-based unlocking method is provided, and a description is provided by an example in which the method is applied to the terminal 102 in FIG. 1, including the following steps.

In S202, an expression unlock page is displayed.

The expression unlock page may refer to a page for unlocking using a facial expression, or a page for verifying a facial expression of a to-be-tested object, for example, an expression unlock page for unlocking when a terminal is to be unlocked to enter a user operation interface, an expression unlock page for unlocking when a fund management page or another page with private information of an application is entered (for example, a chat record page in a social application), or an expression unlock page for using a facial expression for payment in a payment scene.

Figure 3:
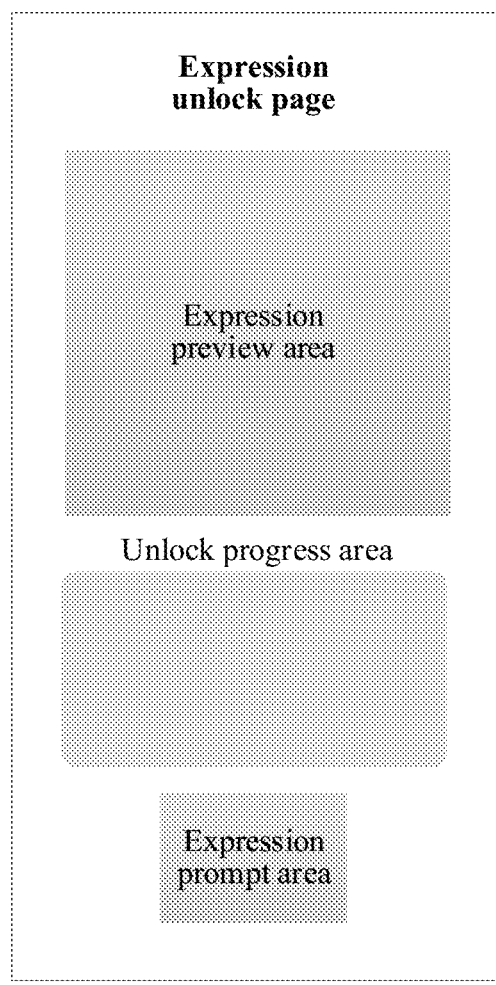
FIG. 3 is a schematic diagram of an expression unlock page according to an embodiment.

For example, as shown in FIG. 3, the expression unlock page includes a face preview area, an unlock progress area, and an expression prompt area. The face preview area is used for displaying a facial image captured in real time. The unlock progress area is used for displaying an unlock node sequence, and in a case that an unlocking operation has performed on an unlock node, an unlock status identification indicating that the unlocking operation has been performed is displayed at the position of the unlock node. The expression prompt area may be used for displaying a prompt image corresponding to the unlock node, and during unlocking of a first unlock node, the expression prompt area may display a prompt image associated with the first unlock node. For example, in a case that a pre-entered expression corresponding to the first unlock node is a smiling expression, the prompt image may be a blue sky. If the pre-entered expression corresponding to the first unlock node is an expression of opening the mouth, the prompt image may be a sunflower.

In an embodiment, the terminal may display the expression unlock page upon detection of an unlock instruction, detection of an operation instruction of entering a page with private information, detection of an operation instruction of entering a fund management page, or detection of a payment instruction. In addition, in a case that a face recognition instruction triggered on a face management page is obtained, the expression unlock page is entered. The face may refer to a human face or a face of another object.

Figure 4:
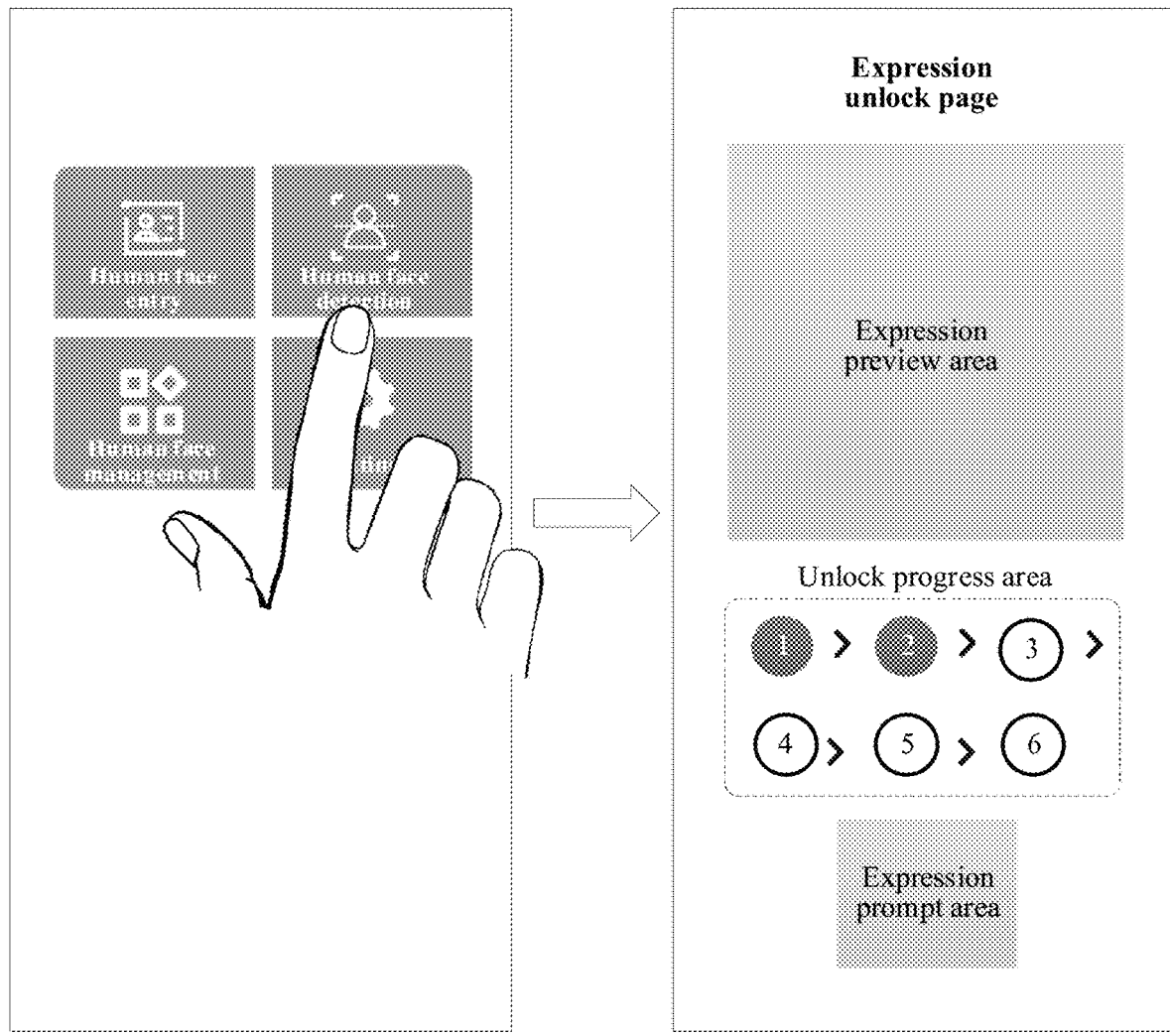
FIG. 4 is a schematic diagram of entering an expression unlock page by triggering a human face detection control according to an embodiment.

For example, in a scenario in which the to-be-tested object is about to enter an operation page of the terminal, the terminal enters the expression unlock page upon receipt of an unlock instruction. Alternatively, in a scenario in which the to-be-tested object is about to use on-line payment, the terminal enters the expression unlock page upon detection of a payment instruction. Alternatively, as shown in FIG. 4, in a case that the to-be-tested object taps or touches a human face recognition control on the face management page, the expression unlock page is entered.

In S204, an unlock node sequence is displayed on the expression unlock page.

The unlock node sequence may refer to a node sequence composed of nodes that need to be unlocked (that is, the unlock nodes). The unlock nodes in the unlock node sequence may be nodes in an order. In other words, the unlock nodes in the unlock node sequence are unlocked sequentially in an order during unlocking. The unlock node sequence may correspond to a security lock or a string of passwords, and the unlock nodes in the unlock node sequence are unlocked using corresponding facial expressions.

In an embodiment, during displaying of the expression unlock page, the unlock node sequence is displayed in the unlock progress area. In the unlock progress area, a pointer, such as an arrow or a ">" symbol, may be displayed between the unlock nodes in the unlock node sequence, as shown in FIG. 4.

In an embodiment, after S204, the terminal may further display, in the face preview area of the expression unlock page, the facial image captured in real time.

The face may generally refer to a face portion, a chin portion, a lip portion, an eye portion, a nose portion, an eyebrow portion, a forehead portion, an ear portion, and the like of the to-be-tested object. The face preview area may display a face capture frame, to intercept a facial tile of a facial image through the face capture frame, which can avoid the problem of high amount of calculation caused by recognition of the entire facial image.

In an embodiment, the terminal captures the to-be-tested object in real time through a built-in camera or an external camera connected to the terminal, to obtain a facial image of the to-be-tested object, and then displays, in the face preview area of the expression unlock page, the facial image captured in real time. The facial image may include the face of the to-be-tested object, or may include the face and a hand portion of the to-be-tested object.

In an embodiment, after the step of displaying, in the face preview area of the expression unlock page, the facial image captured in real time, the method may further determine whether a facial key point in the facial image is located within the face capture frame. If it is, S206 is performed. If it is not, prompt information for adjusting a capture orientation is transmitted.

The facial key point may be an ear portion, a chin portion, a forehead portion, and the like of the to-be-tested object. In a case that the ear portion, the chin portion, and the forehead portion in the facial image are within the face capture frame, it may indicate that the entire face is within the face capture frame.

Figure 5:
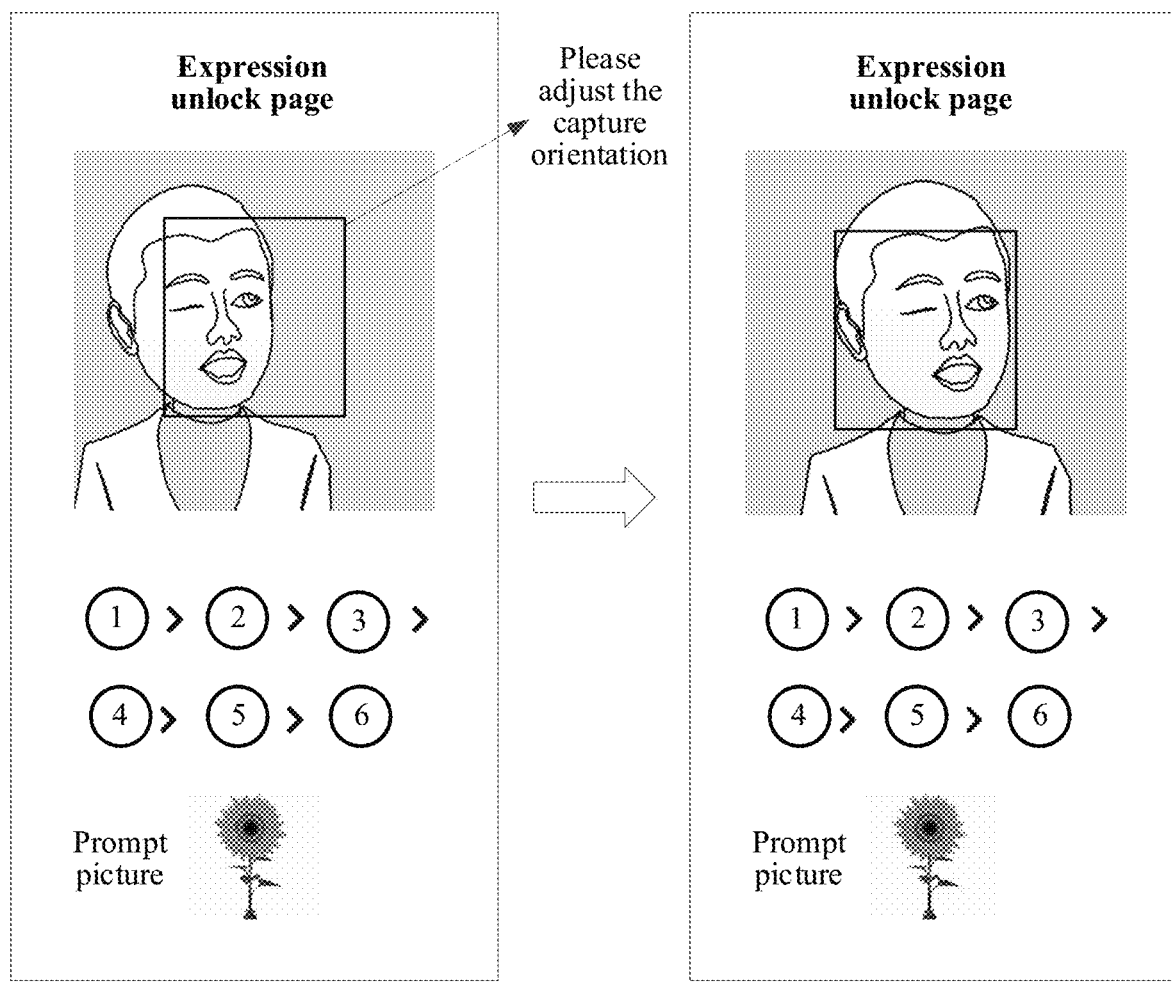
FIG. 5 is a schematic diagram of prompting to adjust a capture orientation according to an embodiment.

For example, as shown in FIG. 5, in response to a determination that a facial key point in the facial image detected is not located within the face capture frame (such as the black rectangular frame in FIG. 5), prompt information of "Please adjust the capture orientation" is displayed near the face capture frame, to enable the entire face in the facial image to be within the face capture frame.

In S206 an unlock status identification (unlock status notification) is created at a to-be-processed unlock node (a current unlock node) in the unlock node sequence, based on a facial expression in a facial image captured in real time.

The to-be-processed unlock node may refer to a node on which no unlocking operation has been performed in the unlock node sequence. In this embodiment, the to-be-processed unlock node may also refer to a node on which no unlocking operation has been performed and on which an unlocking operation needs to be performed currently in the unlock node sequence.

The unlock status identification may be used for indicating that unlocking of the to-be-processed unlock node has been successfully completed, or that the unlocking operation has been performed on the to-be-processed unlock node but whether the unlocking has been successfully completed is not determined. According to the two meanings of the unlock status identification, S206 may be divided into the following two scenarios.

In Scenario 1, the unlock status identification indicates that the unlocking operation has been performed on the to-be-processed unlock node but whether the unlocking has been successfully completed is not determined.

In an embodiment, the unlock node sequence is displayed in the unlock progress area of the expression unlock page. The step of displaying, in the face preview area of the expression unlock page, the facial image captured in real time further includes: sequentially performing, by the terminal, facial expression recognition on a facial image corresponding to each to-be-processed unlock node in the unlock node sequence in an order of the unlock nodes in the unlock node sequence; and creating the unlock status identification at the corresponding unlock node of the unlock progress area each time after the facial expression recognition is completed. The unlock status identification may be used for indicating that the unlocking operation has been performed on the current to-be-processed unlock node. The unlock status identification includes: a state identification indicating that the unlocking operation has been performed and the unlock node has been successfully unlocked and a state identification indicating that the unlocking operation has been performed but the unlock node has not been successfully unlocked.

The unlocking step of a to-be-processed unlock node in the unlock node sequence may further include: during unlocking of the current to-be-processed unlock node in the unlock node sequence, performing, by the terminal, facial expression recognition on a facial image captured currently, comparing a recognized facial expression with a target expression corresponding to the to-be-processed unlock node, and after obtaining a comparison result, creating the unlock status identification at the current to-be-processed unlock node. After the unlock status identification is created, the current to-be-processed unlock node is transformed into a processed unlock node, and then unlocking is performed on the remaining to-be-processed unlock nodes.

Figure 6:
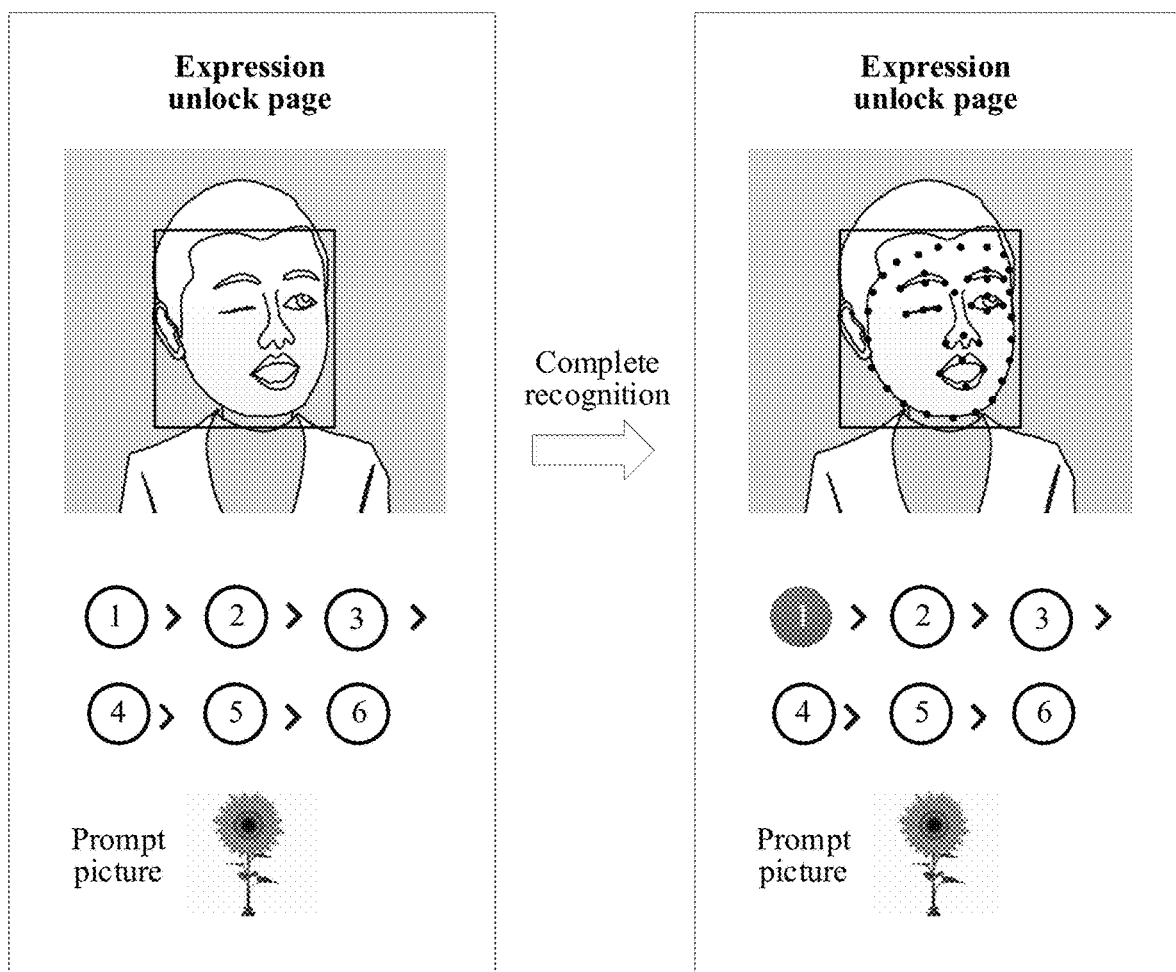
FIG. 6 is a schematic diagram of performing recognition on a facial image and superimposing an expression model map that is obtained through recognition on a facial expression according to an embodiment.

For example, as shown in FIG. 6, in the figure on the left, none of the unlock nodes (i.e., nodes 1-6) in the unlock node sequence have gone through an unlocking operation. Upon detection of that the entire face in the facial image is located within the face capture frame, the first unlock node in the unlock node sequence is first unlocked, and the unlocking process includes: performing facial expression recognition on the facial image displayed in the face preview area, that is, performing facial expression recognition on a facial tile in the face capture frame, to obtain a recognition result of the facial expression. The facial expression is an expression of opening the mouth and squinting the left eye. After obtaining the recognition result of the facial expression, the recognized facial expression is compared with a target expression corresponding to the first unlock node, and after the comparison result is obtained, the unlock status identification, which indicates that the unlocking operation has been performed on the first unlock node, is created at the position of the first unlock node. Deduced by analogy, unlocking is performed on the other unlock nodes in the unlock node sequence.

In an embodiment, an expression model map corresponding to a facial expression is generated after each time a terminal completes facial expression recognition. The expression model map is superimposed and displayed on the corresponding facial image in the face preview area, then the expression model map is compared with the expression map of the corresponding unlock node, and after obtaining a comparison result, the unlock status identification is created at the to-be-processed unlock node, so as to prompt that recognition of the facial image corresponding to the to-be-processed unlock node has been completed. The expression model map may refer to the black dots in FIG. 6.

In Scenario 2, the unlock status identification indicates that unlocking of the to-be-processed unlock node has been successfully completed.

In an embodiment, an expression model map corresponding to a facial expression is generated after each time a terminal completes facial expression recognition. The expression model map is superimposed and displayed on the corresponding facial image in the face preview area. In response to a determination that the expression model map is consistent with the expression map of the corresponding unlock node, it is determined that the facial expression in the facial image matches the corresponding target expression, and then the unlock status identification is created at the to-be-processed unlock node in the unlock node sequence.

The expression model map may refer to a map generated according to the recognized facial expression, which can be used for representing the facial expression of the to-be-tested object. In addition, the expression model map may also be used for indicating that facial expression recognition has been performed on the facial image corresponding to the to-be-processed unlock node.

In response to a determination that the expression model map is consistent with the expression map of the corresponding unlock node, it is determined that the facial expression in the facial image matches the pre-entered expression map of the to-be-processed unlock node, and in this case, the to-be-processed unlock node can be successfully unlocked.

For example, as shown in FIG. 6, during unlocking of the first unlock node, the facial expression in the facial image is recognized, and after all facial key points in the facial image are recognized, an expression model map matching the facial expression of opening the mouth and squinting the left eye is generated, and then superimposed on the facial expression in the facial image. Then, the expression model map is compared with the pre-entered expression map corresponding to the first unlock node, and if consistent, the unlock status identification is generated at the position of the first unlock node.

In the process of unlocking each unlock node, the expression corresponding to the unlock node that needs to be unlocked can be prompted by a prompt image.

In an embodiment, the expression unlock page includes an expression prompt area. The method also includes: in the process of unlocking the to-be-processed unlock node in the unlock node sequence, displaying, in the expression prompt area, a prompt image corresponding to the to-be-processed unlock node in response to an expression prompt operation triggered in the expression prompt area. Therefore, the user can associate the corresponding facial expression by using the prompt image in a case of forgetting what facial expression corresponding to the unlocking. It is to be understood that for the target object that enters the target expression, the prompt image can be used for associating an image of a facial expression, and the other users may not be clear about the specific meaning of the prompt image, such as using a sunflower image to associate an open mouth.

As shown in FIG. 5, during unlocking of the first unlock node, when the to-be-tested object forgets the facial expression, the sunflower image can be used for determining what facial expression is corresponding to the first unlock node, so that the user makes the facial expression to unlock the first unlock node.

In S208, unlocking is completed based on the unlock status identification and a degree of match between the facial expression in the corresponding facial image and a corresponding target expression.

In an embodiment, when the unlock status identification is created at each unlock node in the unlock node sequence and the facial expression in the corresponding facial image matches the corresponding target expression, the unlocking succeeds. For example, referring to FIG. 6, in a case that the positions of unlock nodes 1-6 are all changed from colorless (or white) to gray and the facial expressions in the corresponding facial images match the corresponding target expressions, the unlocking succeeds. Alternatively, in a case that unlock status identifications are created at at least two unlock nodes in the unlock node sequence and the facial expressions in the corresponding facial images match the corresponding target expressions, the unlocking succeeds. For example, referring to FIG. 6, in a case that the positions of unlock nodes 1-3 are all changed from colorless (or white) to gray and the facial expressions in the corresponding facial images corresponding to the unlock nodes 1-3 match the corresponding target expressions, the unlocking succeeds.

The target expressions may refer to expressions in pre-entered expression maps. For example, security locks are set at six unlock nodes, one or more expression maps are pre-entered for each unlock node, and the expressions in the expression maps are the target expressions.

In response to a determination that the recognized facial expression matches the expression map corresponding to the corresponding to-be-processed unlock node, it is determined that the facial expression matches the corresponding target expression. Conversely, in a case that the recognized facial expression matches the corresponding target expression, it indicates that the facial expression matches the expression map corresponding to the corresponding to-be-processed unlock node.

In addition, in response to a determination that the created expression model map matches the corresponding expression map corresponding to the to-be-processed unlock node, it is determined that the expression model map matches the corresponding target expression. Conversely, in a case that the created expression model map matches the corresponding target expression, it indicates that the expression model map matches the expression map corresponding to the corresponding to-be-processed unlock node.

In an embodiment, in the process of unlocking each unlock node, the terminal records a time interval corresponding to each unlock node upon completion of unlocking and then calculates a total time interval. In a case that an unlock status identification is created at each unlock node in the unlock node sequence, the facial expression in each facial image matches the corresponding target expression, and the total time interval is less than a preset time interval, the unlocking succeeds.

When an unlock status identification is created at each unlock node in the unlock node sequence, but there is one or more facial images of which the facial expression/expressions mismatches/mismatch the corresponding target expression/expressions, the terminal fails in the unlocking. In this case, unlocking may be performed again, that is, S204 to S208 may be returned, and the unlocking is suspended until the unlocking succeeds or a cumulative quantity of unlock failures reaches a preset quantity of times.

In an embodiment, when the unlock status identification is created at each unlock node in the unlock node sequence, but the facial expression in at least one facial image mismatches the corresponding target expression, the terminal transmits prompt information of unlock failure. Displaying of the unlock status identification is canceled and S204 to S208 are returned.

In an embodiment, when the unlocking fails, the cumulative quantity of unlock failures is obtained. In a case that the cumulative quantity reaches the preset quantity of times, the unlocking process is suspended. A reserved communication number is obtained and alarm information is transmitted to the reserved communication number.

The cumulative quantity may refer to a total quantity of unlock failures in this round or a total quantity of unlock failures within a preset time period, and the preset time period may be set according to system requirements, which is not specifically limited in this embodiment. The reserved communication number may refer to: a communication identification reserved by the target object (for example, a user who enters an expression map) in an application account of a terminal for receiving alarm information or for emergency contact, such as a reserved mobile phone number, an email account, or other instant messaging accounts and the like. It is to be understood that the cumulative quantity of unlock failures refers to a total quantity of consecutive unlock failures, and once there is one unlock success, the cumulative quantity of unlock failures is set to zero.

For example, the reserved communication number is a reserved mobile phone number. In a case that the cumulative quantity of unlock failures within 5 minutes reaches a preset quantity of times 5, the unlocking process is suspended and alarm information is transmitted to the reserved mobile phone number to alert a target user corresponding to the reserved mobile phone number, so as to inform the target user to reset the password to prevent others from maliciously unlocking, or to inform the target user to re-obtain the password.

Figure 7:
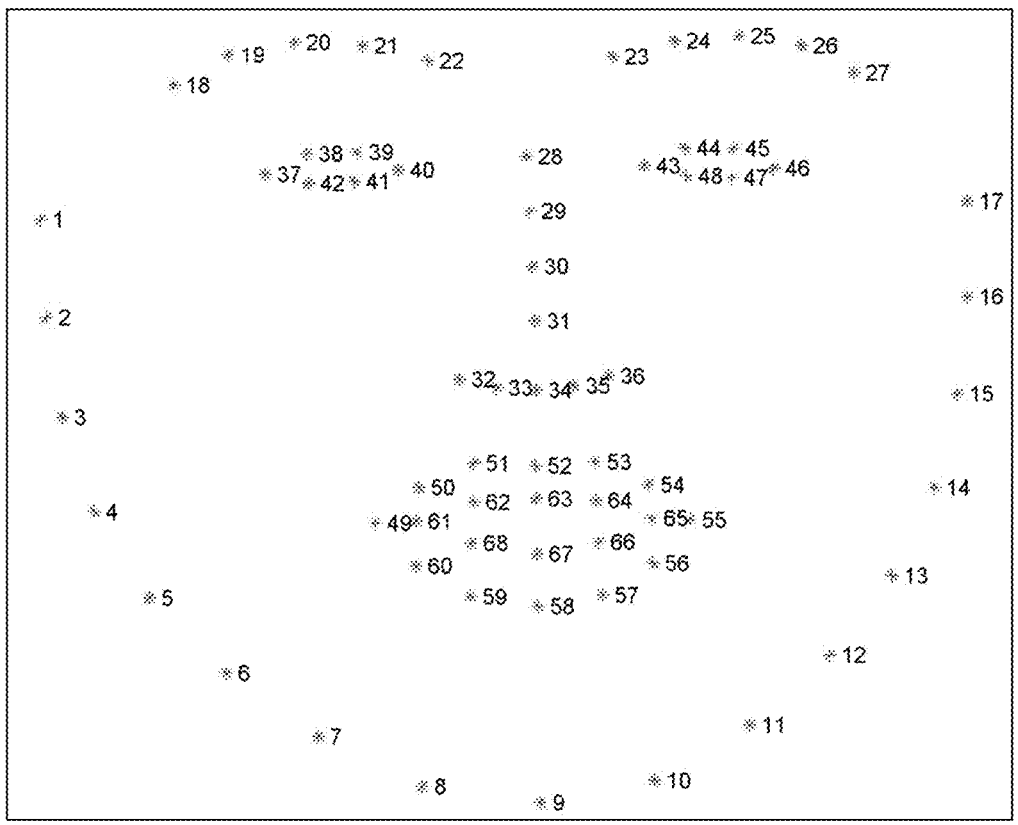
FIG. 7 is a schematic diagram of facial feature points according to an embodiment.

In an example, by performing human face recognition on a facial image, a recognition result of facial feature points in FIG. 7 can be obtained. For the convenience of description below, the facial feature points obtained through the recognition are marked by using numerals. For example, as shown in FIG. 7, 1 to 17 represent facial edge feature points, 18 to 22 and 23 to 27 correspondingly represent left eyebrow feature points and right eyebrow feature points of a user, 28 to 36 represent nose feature points of the user, 37 to 42 represent left eye feature points of the user, 43 to 48 represent right eye feature points of the user, and 49 to 68 represent lip feature points of the user. The foregoing is merely an example. In an embodiment, only some or more feature points in the facial feature points may be recognized, or the feature points are marked in other manners. These all fall within the scope of the embodiments of the present disclosure.

Facial feature point recognition technologies are usually grouped into two categories according to different criteria used: (1) Local feature-based methods and (2) Integer-based methods.

In an embodiment, the local feature-based method may describe a face by using local geometric features of the face, such as relative positions and relative distances of some facial organs (eyes, nose, mouth, and the like). Feature components usually include Euclidean distances, curvatures, angles, and the like between feature points, and an efficient description of prominent features of the face can be implemented.

For example, facial feature points are located using an integrated projection method, and Euclidean distances between feature points are used as the feature components to recognize multi-dimensional facial feature point vectors for use in classification. The feature components mainly include: a vertical distance between a center of an eyebrow and that of an eye; a plurality of descriptive data of an eyebrow radian; a width of a nose and a vertical position of the nose; and a nostril position, a face width, and the like. Through recognition of the facial feature points, a correct recognition rate of 100% can be obtained in the recognition process.

In an embodiment of the present disclosure, the local feature-based method may also be an empirical description of general features of facial feature points. For example, a facial image has some prominent basic features. For example, a facial area usually includes facial feature points such as an eye portion, a nose portion, and a lip portion, with brightness generally lower than that of surrounding areas. The eyes are roughly symmetrical, and the nose and the mouth are distributed on an axis of symmetry.

In the integer-based method, a facial image is used as a whole to perform specific transformation to process and recognize features. In the method, in addition to that overall properties of a face are taken into consideration, a topological relationship between face portions and information of the portions are also retained.

Because the dimension of a facial image is usually very high, and the distribution of the facial image in a high-dimensional space is not compact, it is not conducive to classification, and the computational complexity is also very high. A method of subspace analysis may be used for finding a linear or non-linear spatial transformation according to a particular target, and source high-dimensional data is compressed into a low-dimensional subspace, so that the distribution of data in this subspace is more compact, thereby reducing the complexity of calculation.

In addition, a group of rectangular grid nodes can also be placed on the facial image, a feature of each node is described by a multi-scale wavelet feature at the node, and a connection relationship between the nodes is represented by a geometric distance, so as to form a face representation based on a two-dimensional topological graph. In the process of face recognition, recognition is performed based on similarities between nodes and between connections in two images.

In addition to the subspace analysis method and an elastic map matching method described above, there are also methods based on a neural network and the like. In the embodiment of the present disclosure, the type of the facial feature point recognition method is not limited.

In the embodiments, the unlock node sequence composed of a plurality of unlock nodes is configured on the expression unlock page, and during unlocking of each unlock node, expression recognition needs to be performed on a facial image captured in real time. In addition, each unlock node corresponds to a particular target expression, and the whole unlocking process is completed only when the facial expressions in the facial images corresponding to all the unlock nodes match the target expressions corresponding to the unlock nodes; and therefore, unauthorized unlocking implemented by use of an image or a human face model can be effectively avoided and the information security is effectively improved.

Figure 8:
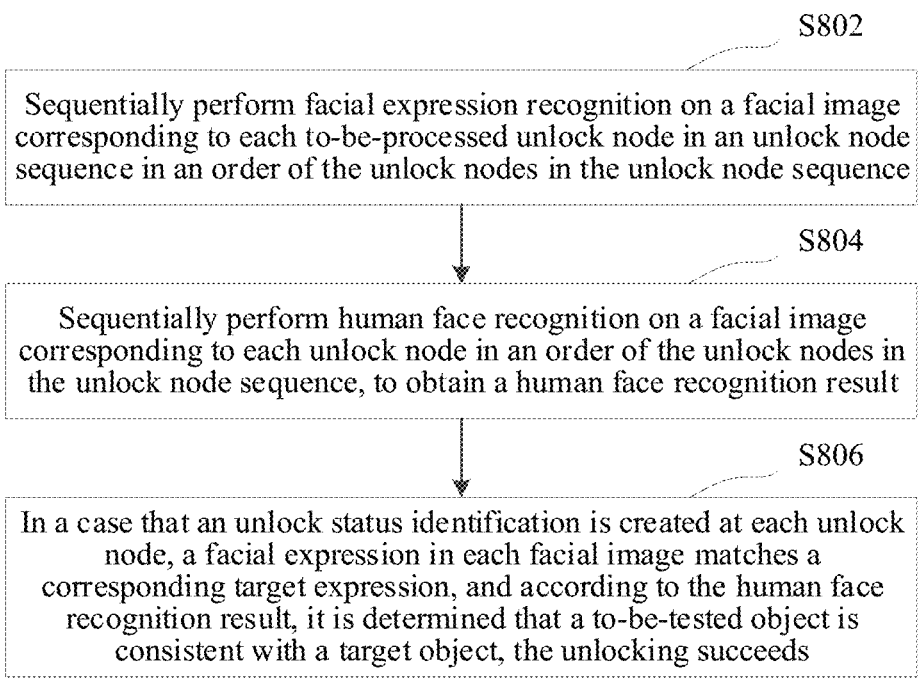
FIG. 8 is a schematic flowchart of performing unlocking steps by combining an expression and a human face according to an embodiment.

In an embodiment, in addition to the unlocking using a facial expression, the unlocking may also be performed by combining facial expression and human face recognition. As shown in FIG. 8, the method may also include the following steps.

In S802, facial expression recognition is sequentially performed on a facial image corresponding to each to-be-processed unlock node in an unlock node sequence in an order of the unlock nodes in the unlock node sequence.

The facial expression may be an expression presented by enabling different portions of a face to perform corresponding actions or to be in corresponding postures, for example, the expression of opening the mouth and squinting the left eye in FIG. 5 and FIG. 6.

In an embodiment, the step of facial expression recognition includes: extracting, by a terminal, eye feature points from the facial image; among the eye feature points, determining a first distance between an upper eyelid feature point and a lower eyelid feature point and determining a second distance between a left eye corner feature point and a right eye corner feature point; and determining an eye portion posture according to a relationship between a ratio of the first distance to the second distance and at least one preset range.

The left eye corner feature point and the right eye corner feature point respectively refer to the left eye corner feature point and the right eye corner feature point of a same eye. For example, for the left eye, the left eye corner feature point refers to the left eye corner feature point of the left eye, and the right eye corner feature point refers to the right eye corner feature point of the left eye.

For example, as shown in FIG. 7, the terminal calculates a first distance between the upper eyelid feature point 38 and the lower eyelid feature point 42 according to the facial feature points captured through the human face recognition technology, and calculates a second distance between the left eye corner feature point 37 and the right eye corner feature point 40. When a ratio of the first distance to the second distance is 0, it is determined that the to-be-tested object squints the left eye. In a case that the ratio of the first distance to the second distance is less than 0.2, it is determined that the to-be-tested object blinks the left eye. In a case that the ratio of the first distance to the second distance is greater than 0.2 and less than 0.6, it is determined that the to-be-tested object goggles the left eye.

For the lip portion posture, the following methods can be used for recognition.

In Method 1, the lip portion posture is recognized according to heights of lip feature points.

In an embodiment, the step of facial expression recognition also includes: extracting, by a terminal, lip feature points from the facial image; and among the lip feature points, determining a lip portion posture according to a height difference between a lip center feature point and a lip corner feature point.

For example, as shown in FIG. 7, the terminal determines a height of the lip center feature point 63 and a height of the lip corner feature point 49 (or 55), and then calculates a height difference between the lip center feature point 63 and the lip corner feature point 49 (or 55). In a case that the height difference is positive (that is, the height of the lip center feature point 63 is higher than the height of the lip corner feature point 49), it is determined that the lip portion posture is a smile.

In Method 2, the lip portion posture is recognized according to a distance between upper and lower lip feature points.

In an embodiment, among the lip feature points, the terminal determines the lip portion posture according to a third distance between an upper lip feature point and a lower lip feature point.

For example, according to the facial feature points obtained through the human face recognition technology, the third distance between the upper lip feature point and the lower lip feature point is compared with a distance threshold, and in response to a determination that the third distance reaches the distance threshold, it is determined that the lip portion posture is opening the mouth. As shown in FIG. 7, the third distance between the upper lip feature point 63 and the lower lip feature point 67 is compared with the distance threshold, and in response to a determination that the third distance is greater than or equal to the distance threshold, it is determined that the to-be-tested object is opening the mouth.

In another embodiment, the terminal calculates a fourth distance between a left lip corner feature point and a right lip corner feature point, and in response to a determination that the third distance is greater than or equal to the fourth distance, it is determined that the lip portion posture is opening the mouth.

In Method 3, the lip portion posture is recognized according to a ratio of the distance between the upper and lower lips to the distance between the left and right lip corner feature points.

In an embodiment, among the lip feature points, the lip portion posture is determined according to a relationship between the ratio of the third distance to a fourth distance and at least one preset range. The fourth distance is a distance between a left lip corner feature point and a right lip corner feature point.

For example, as shown in FIG. 7, the terminal determines the third distance between the upper lip feature point 63 and the lower lip feature point 67, and determines the fourth distance between the left lip corner feature point 49 and the right lip corner feature point 55, and the lip portion posture is determined according to the relationship between the ratio of the third distance to the fourth distance and at least one preset range. For example, in a case that the ratio of the third distance to the fourth distance is within a first preset range, it is determined that the lip portion posture is an open mouth. In addition, in a case that the ratio of the third distance to the fourth distance is within a second preset range, it is determined that the lip portion posture is a closed mouth. Values of the first preset range are all greater than values of the second preset range.

In an embodiment, the step of facial expression recognition also includes: extracting an eyebrow feature point and an eyelid feature point from the facial image; determining a fifth distance between the eyebrow feature point and the eyelid feature point; and determining an eyebrow posture according to a relationship between the fifth distance and a preset distance.

For example, as shown in FIG. 7, the distance between the eyebrow feature point (one of points 18-22) and the eyelid feature point 38 is calculated, and in a case that the distance is greater than a preset distance, it is determined that the to-be-tested object is lifting the eyebrow.

In S804, human face recognition is sequentially performed on the facial image corresponding to each unlock node in the order of the unlock nodes in the unlock node sequence, to obtain a human face recognition result.

The process of human face recognition may refer to S208 of the foregoing embodiment.

In S806: in response to a determination that an unlock status identification is created at each unlock node, a facial expression in each facial image matches a corresponding target expression, and according to the human face recognition result, it is determined that a to-be-tested object is consistent with a target object, and the unlocking succeeds.

During unlocking using a facial expression, human face recognition may also be performed, to determine whether the human face matches a pre-entered human face of a target object, and if so, it indicates that the to-be-tested object and the target object are the same object. The facial image is an image obtained by capturing the to-be-tested object.

When an unlock status identification is created at each unlock node, a facial expression in each facial image matches a corresponding target expression, and according to the human face recognition result, it is determined that a to-be-tested object is inconsistent with a target object, the unlocking fails. In a case that it is determined that the to-be-tested object is inconsistent with the target object according to the human face recognition result, it indicates that the currently detected to-be-tested object and the target object are not the same object, and in this case, the unlocking fails.

In the foregoing embodiment, the facial expression and the human face recognition are combined for unlocking, which can further improve the security of the unlock node sequence and improve information security of the terminal.

Figure 9:
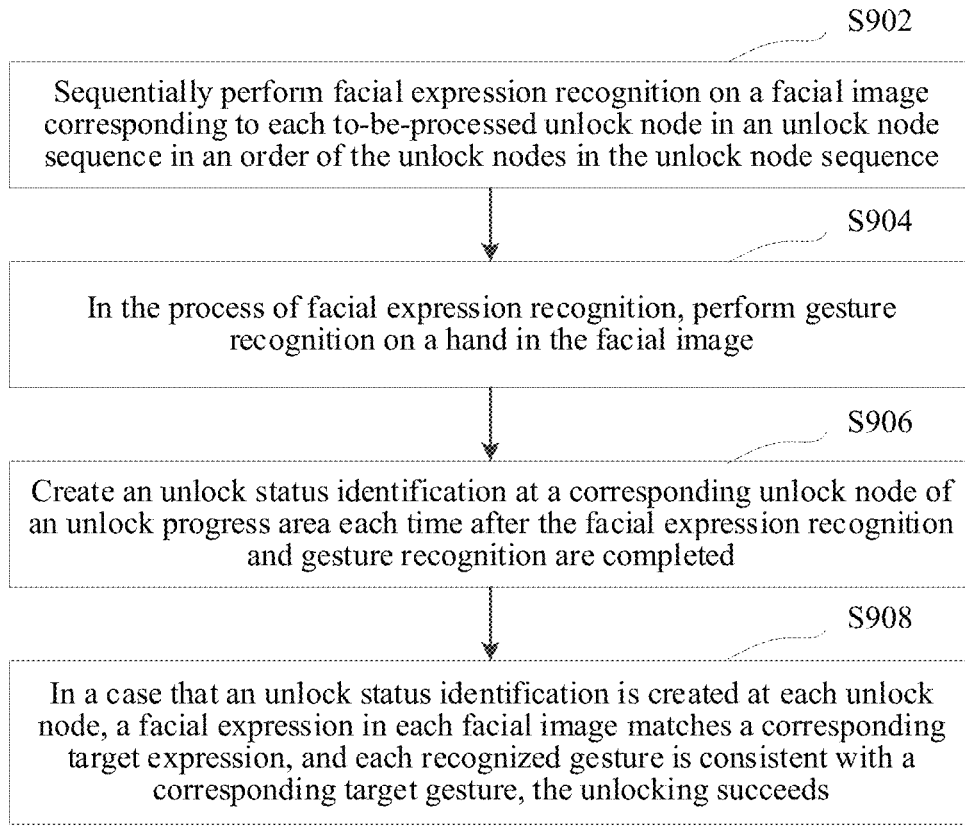
FIG. 9 is a schematic flowchart of performing unlocking steps by combining an expression and a gesture according to an embodiment.

In an embodiment, in addition to the unlocking using a facial expression, the unlocking may also be performed by combining a facial expression and a gesture, as shown in FIG. 9, the method may also include the following steps.

In S902, facial expression recognition is sequentially performed on a facial image corresponding to each to-be-processed unlock node in an unlock node sequence in an order of the unlock nodes in the unlock node sequence.

The facial expression may be an expression presented by enabling different portions of a face to perform corresponding actions or to be in corresponding postures, for example, the expression of opening the mouth and squinting the left eye in FIG. 5 and FIG. 6.

The recognition of a facial expression may refer to S802 of the foregoing embodiment.

In S904, in the process of facial expression recognition, gesture recognition is performed on a hand in the facial image.

In an embodiment, the terminal performs convolutional processing on the facial image through a neural network model, so as to extract a gesture feature from the facial image, and determine a specific gesture according to the gesture feature.

The neural network model may be a network model for extracting a gesture feature, and may particularly be a two-dimensional convolutional neural network model. The two-dimensional network model may be one of network branches of a machine learning model.

In S906, an unlock status identification is created at a corresponding unlock node of an unlock progress area after each facial expression recognition and gesture recognition are completed.

In an embodiment, the terminal may also determine whether the facial expression is consistent with the corresponding target expression after each completion of facial expression recognition. In addition, the terminal may also determine whether the gesture is consistent with a corresponding hand target gesture each time after completion of gesture recognition, and in a case that the facial expression is consistent with the corresponding target expression and the gesture is consistent with the corresponding target gesture, the unlock status identification is created at the corresponding unlock node in the unlock progress area.

In S908, in response to a determination that an unlock status identification is created at each unlock node, a facial expression in each facial image matches a corresponding target expression, and each recognized gesture is consistent with a corresponding target gesture, the unlocking succeeds.

In the foregoing embodiment, the facial expression and the gesture are combined for unlocking, which can further improve the security of the unlock node sequence and improve the information security of the terminal.

Figure 10:
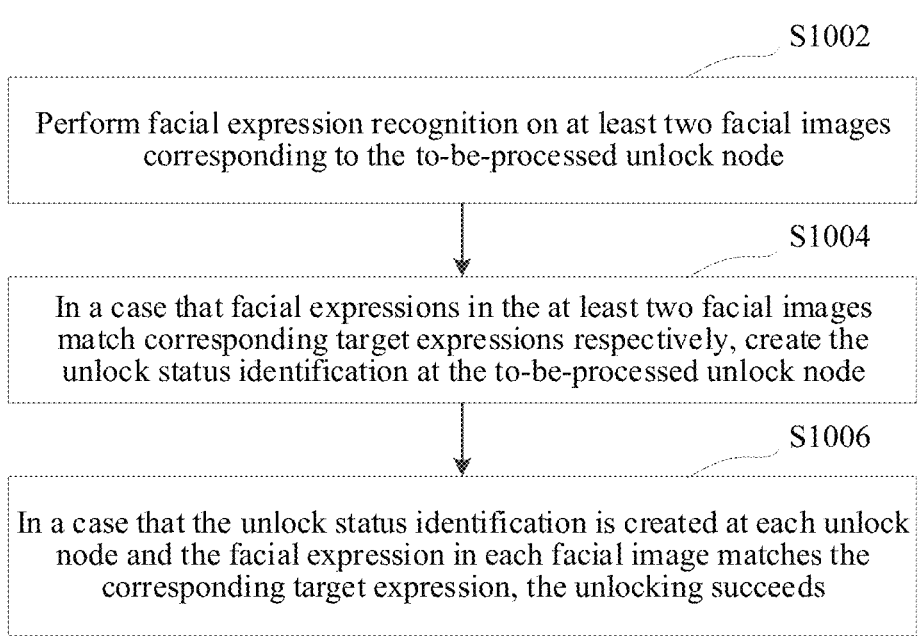
FIG. 10 is a schematic flowchart of performing unlocking steps on each unlock node using at least two facial expressions according to an embodiment.
Figure 11:
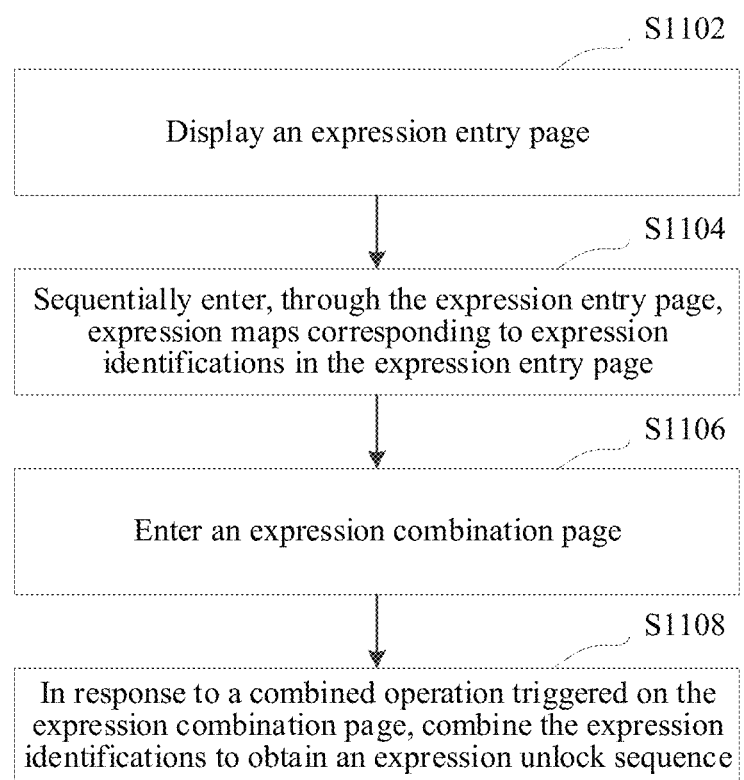
FIG. 11 is a schematic flowchart of steps of entering an expression map according to an embodiment.

In an embodiment, each unlock node may be unlocked by at least two facial expressions, and each unlock node corresponds to at least two different target expressions. As shown in FIG. 10, S206 may further include the following steps.

In S1002, facial expression recognition is performed on at least two facial images corresponding to the to-be-processed unlock node.

During unlocking of the to-be-processed unlock node, the facial expression recognition may be performed on the at least two facial images corresponding to the to-be-processed unlock node.

For example, during unlocking of an unlock node 1, a facial image 1 is first captured, and then the facial expression recognition is performed on the facial image 1 to obtain a facial expression 1. Then, the facial expression recognition is performed on the captured facial image 1 to obtain a facial expression 2.

The process of the facial expression recognition may refer to S802 in the foregoing embodiment.

In S1004, in response to a determination that facial expressions in the at least two facial images match corresponding target expressions respectively, the unlock status identification is created at the to-be-processed unlock node.

The facial expressions in at least two facial images may be the same or different.

In an embodiment, in response to a determination that the facial expressions in the at least two facial images match the corresponding target expressions respectively, the terminal determines an interval between capture times of the at least two facial images; or, determines an interval between unlock times of the to-be-processed unlock node and a previous processed unlock node. In a case that the interval between the capture times or the interval between the unlock times meets a corresponding time interval condition, S1004 is performed. Therefore, waste of time during unlocking of a same unlock node or unlocking of different unlock nodes can be avoided, the unlocking efficiency can be improved, and in addition, the others are prevented from unlocking an unlock node through a plurality of attempts at different facial expressions.

In S1006, in response to a determination that the unlock status identification is created at each unlock node and the facial expression in each facial image matches the corresponding target expression, the unlocking succeeds.

In the foregoing embodiment, at least two facial expressions are used for unlocking each unlock node, which can further improve the security of the unlock node sequence and improve the information security of the terminal.

In an embodiment, a particular expression map may be pre-entered for each unlock node, and steps of entering the expression map may include the following steps.

In S1102, an expression entry page is displayed.

The expression entry page may include an expression identification, or may not include an expression identification. The expression identification is used for indicating a corresponding expression type, and different expression identifications correspond to different expression types.

Figure 12:
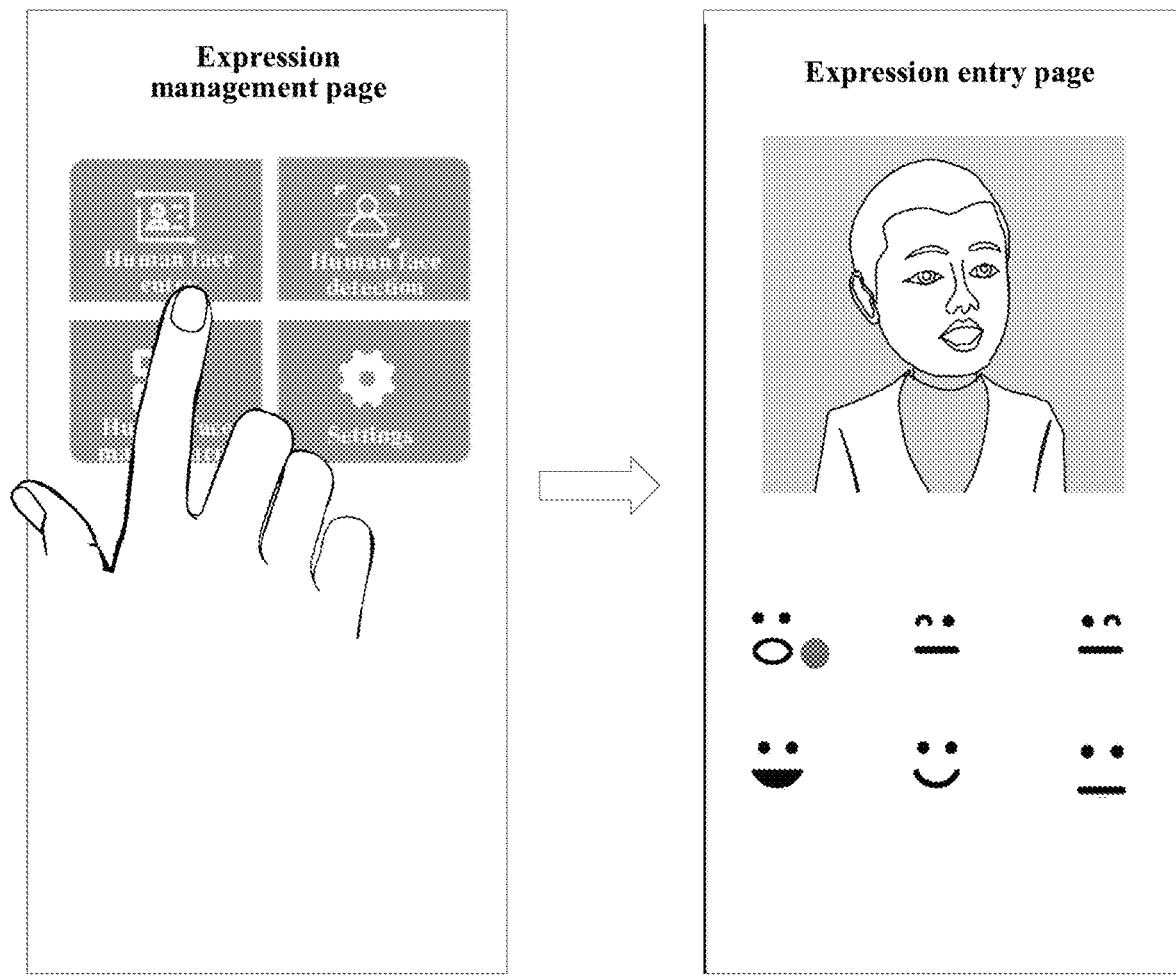
FIG. 12 is a schematic diagram of entering an expression entry page through a human face entry control according to an embodiment.

In an embodiment, in a case that a terminal obtains an expression entry instruction triggered on the expression management page, the terminal switches the page to the expression entry page including an expression identification. As shown in FIG. 12, in a case that an operation of tapping or touching on a human face entry control of the expression management page is detected, the expression entry page displaying expression identifications is entered. An upper part of the expression entry page is used for displaying a captured expression map, and a lower part is used for displaying the expression identifications, such as emoticons.

In S1104, expression maps are sequentially entered through the expression entry page corresponding to expression identifications in the expression entry page.

In an embodiment, in a case that the expression entry page includes expression identifications, the terminal sequentially captures expression maps of a target object in an arrangement order of the expression identifications, and then sequentially enters the captured expression maps. As shown in FIG. 12, in the expression entry page, an expression map is first entered for a first expression identification, and then expression maps are sequentially entered for the subsequent expression identifications.

Figure 13:
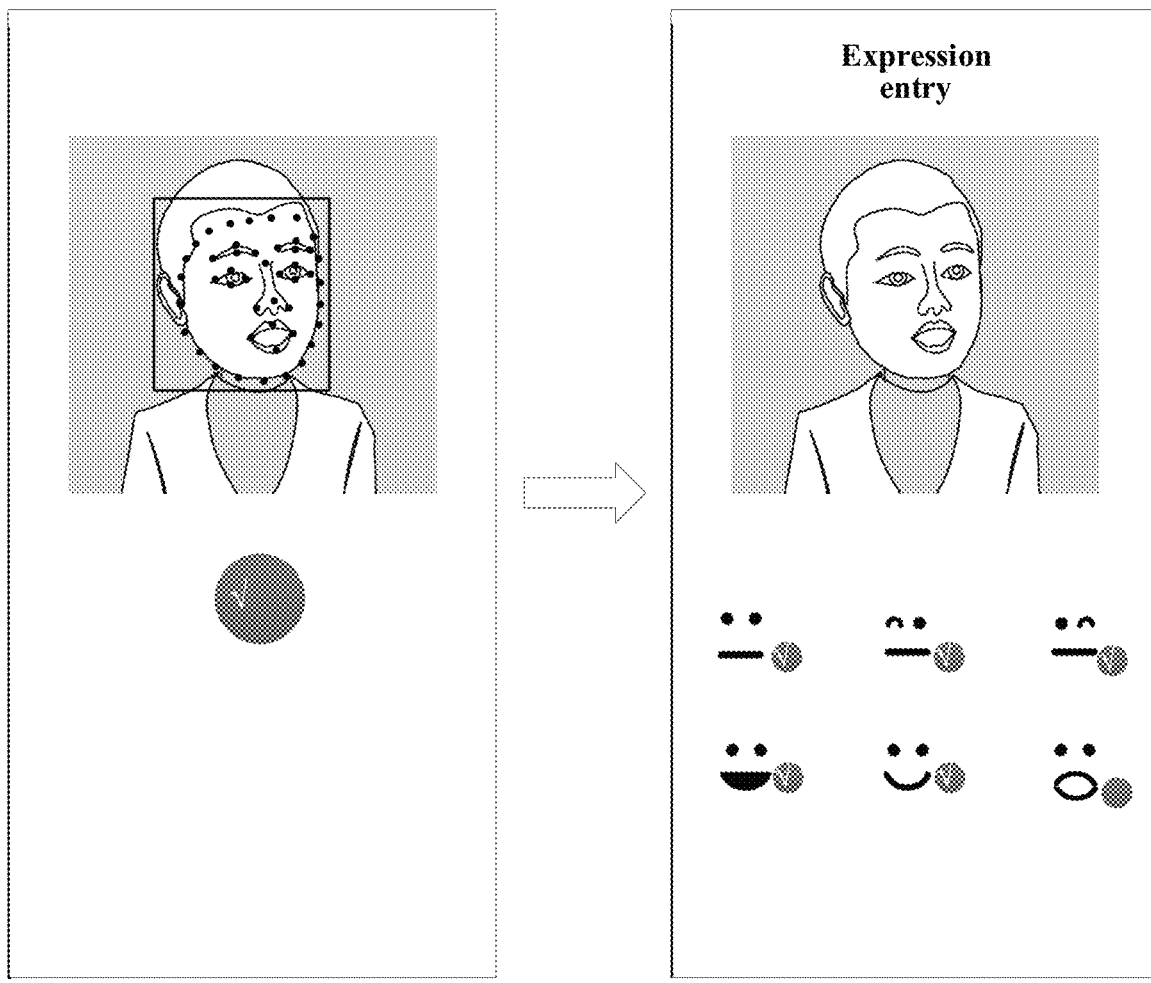
FIG. 13 is a schematic diagram of entering an expression map after expression recognition according to an embodiment.

In an embodiment, when the expression entry page does not include an expression identification, the terminal recognizes a captured expression map, to obtain a target expression; and displays, in an expression identification preview area of the expression entry page, a corresponding expression identification according to the target expression. As shown in FIG. 13, recognition is performed on the facial image in which the mouth is open, to obtain a facial expression in which the mouth is open, and then according to the facial expression in which the mouth is open, an expression identification is created and displayed in the expression identification preview area of the expression entry page.

In S1106, an expression combination page is entered.

The expression combination page may be a page used for combining expression identifications.

In S1108, in response to a combined operation triggered on the expression combination page, the expression identifications are combined to obtain an expression unlock sequence.

In an embodiment, in the expression combination page, the terminal may choose to sort the expression identifications in the expression entry page, and constructs the expression unlock sequence according to the sorted expression identifications. Alternatively, the terminal combines the expression identifications in the expression entry page, then sorts the expression identifications, and constructs the expression unlock sequence according to the combined and sorted expression identifications.

Figure 14:
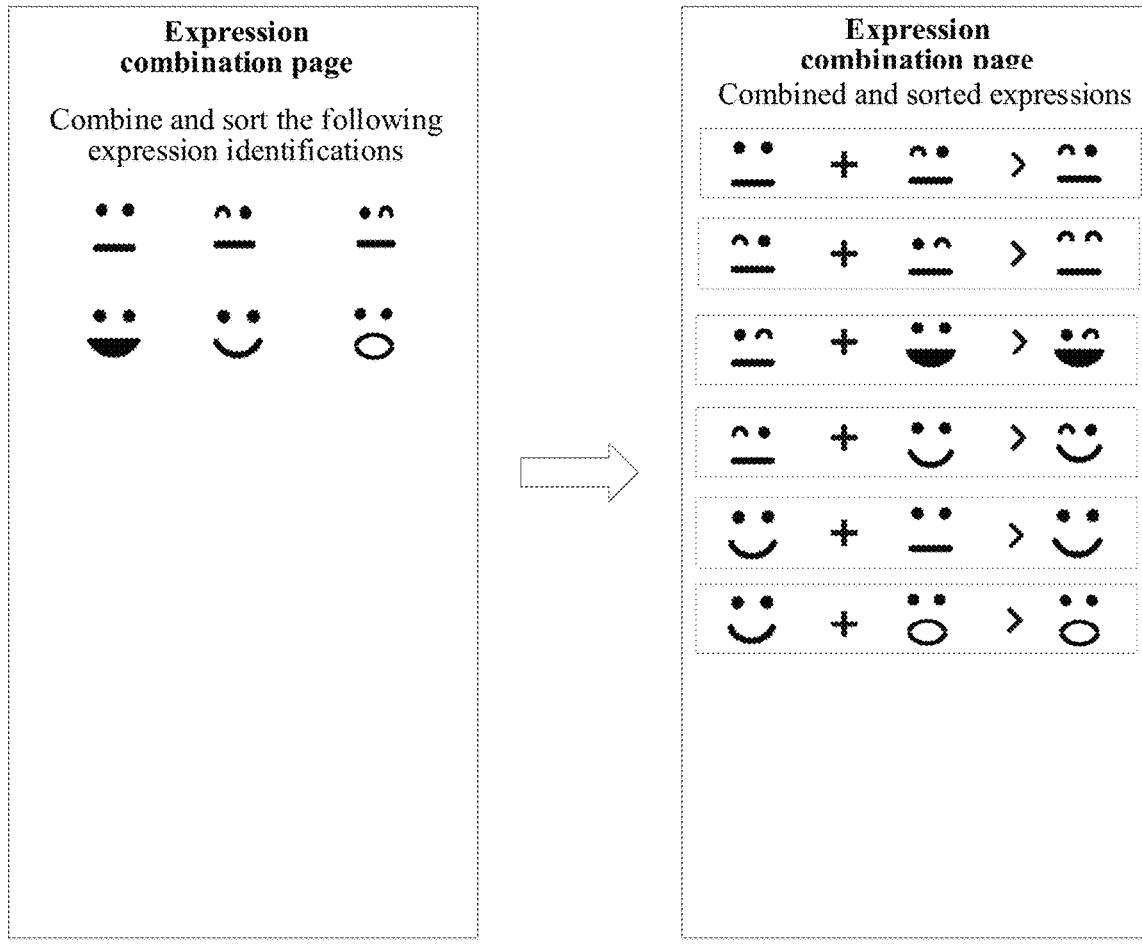
FIG. 14 is a schematic diagram of combining and sorting expression identifications according to an embodiment.

For example, as shown in FIG. 14, the target object may combine the expression identifications in the expression combination page in twos, to obtain corresponding expression combinations. As shown in the expression combination page on the right side of FIG. 14, in the first line, a normal expression is combined with an expression in which the left eye goggles.

In the foregoing embodiment, the corresponding expression maps are pre-entered according to the expression identifications, and then the expression identifications are combined and sorted, to generate the expression unlock sequence, so that during unlocking, the expression unlock node is unlocked according to the corresponding facial expression; in addition, during the unlocking of each unlock node, the currently recognized facial expression needs to be compared with the corresponding pre-entered expression map, and the unlocking of the unlock node can be completed only when the currently recognized facial expression matches the corresponding pre-entered expression map; and therefore, the security of the unlock node can be effectively improved.

Figure 15:
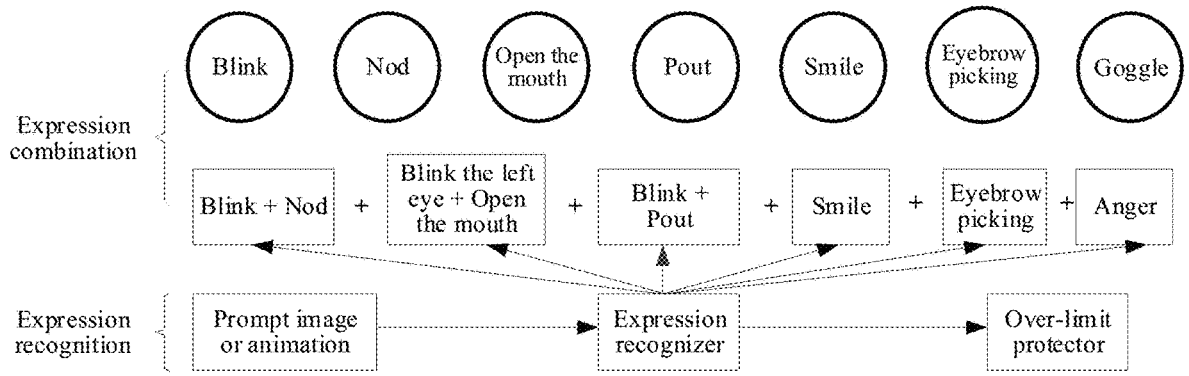
FIG. 15 is a schematic diagram of expression combinations and expression recognition according to an embodiment.
Figure 16:
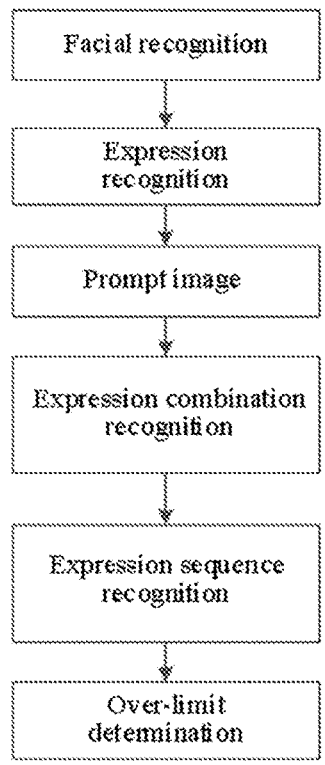
FIG. 16 is a schematic flowchart of a facial expression-based unlocking method according to another embodiment.

For example, a description is provided by using a human face image. As shown in FIG. 15 and FIG. 16, in this embodiment, a function of an intelligent password lock is implemented mainly by prompting through human face recognition+combined expressions+expression sequence+prompt image. The privacy of a user can be well protected, combining of expressions can increase the difficulty of expression recognition cracking, the use of an expression sequence can increase the complexity of unlocking, and the use of prompt image can help the user to remember a password combination, while avoiding password leakage. The expression sequence corresponds to the unlock node sequence.

In this embodiment, a user may customize the combination of different expressions, set the expression sequence, and add a prompt image and picture (or animation) for prompting, to combine a set of password locks, which can meet encryption and decryption needs of the user and enhance the protection of personal privacy. For the definition and decryption of the password lock, the implementation steps include the following.

In step S1, human face feature points are recognized by an expression recognizer, to obtain a corresponding facial expression.

In step S2, logic of expression triggering is redefined and implemented. The following expressions may be recognized, for example.

The expression of blinking may be recognized as follows, for example. According to human face feature points obtained through the human face recognition technology, a distance between central feature points of upper and lower eyelids is divided by a distance between feature points of left and right eye corners, to obtain a ratio between the two distances; and in a case that the ratio between the two distances is less than a preset ratio threshold, the expression is determined as a blink. As shown in FIG. 7, the distance between the left upper eyelid center feature point 38 and the left lower eyelid center feature point 42 is divided by the distance between the left and right eye corner feature points 37 and 40, and in a case that the ratio obtained is less than 0.2, it is determined that the user blinks the left eye.

The expression of goggle (or wide-eyed expression) may be recognized as follows, for example. According to human face feature points obtained through the human face recognition technology, a distance between central feature points of upper and lower eyelids is divided by a distance between feature points of left and right eye corners, to obtain a ratio between the two distances; and in a case that the ratio between the two distances is greater than a preset ratio threshold, the expression is determined as a goggle. As shown in FIG. 7, the distance between the left upper eyelid center feature point 38 and the left lower eyelid center feature point 42 is divided by the distance between the left and right eye corner feature points 37 and 40, and in a case that the ratio obtained is less than 0.6, the expression is determined as blinking the left eye.

The expression of pouting may be recognized as follows, for example. According to human face feature points obtained through the human face recognition technology, a ratio threshold for determining pouting is set, a distance between feature points of upper and lower lips is divided by a distance between feature points of left and right lips, and in a case that a resulting quotient reaches the ratio threshold for determining pouting, the expression is determined as a pout. As shown in FIG. 7, a distance between the upper and lower center feature points 67 and 63 of the lips is divided by a distance between the left and right feature points 49 and 55 of the lips, and in a case that a quotient value obtained is greater than 1.0, the expression is determined as a pout.

The expression of smiling may be recognized as follows, for example. According to human face feature points obtained through the human face recognition technology, in a case that a central feature point of lips is lower than left and right feature points of the lips, the expression is determined as a smile. As shown in FIG. 7, in a case that the position of the center feature point 63 of the lips is lower than the positions of the left and right feature points 49 and 55 of the lips, the expression is determined as a smile.

An angry expression may be recognized as follows, for example. According to human face feature points obtained through the human face recognition technology, in a case that a central feature point of lips is higher than left and right feature points of the lips, the expression is determined as an anger. As shown in FIG. 7, in a case that the position of the center feature point 63 of the lips is higher than the positions of the left and right feature points 49 and 55 of the lips, the expression is determined as an anger.

An open-mouth expression may be recognized as follows, for example. According to human face feature points obtained through the human face recognition technology, a weighted average of unit distances between upper and lower lips is calculated, and a distance threshold for determining opening the mouth is set; and in a case that the distance between the feature points of the upper and lower lips is greater than the distance threshold, the expression is determined as opening the mouth. As shown in FIG. 7, in a case that the distance between the upper lip center feature point 63 and the lower lip center feature point 67 is 0.2 time greater than the distance between the left and right lip feature points 49 and 55, the expression is determined as opening the mouth.

An eyebrow-raising expression may be recognized as follows, for example. According to human face feature points obtained through the human face recognition technology, a distance threshold for determining eyebrow raising is set, and in a case that the distance between an eyebrow feature point and an upper eyelid feature point is greater than the distance threshold, the expression is determined as eyebrow raising.

A nodding expression may be recognized as follows, for example. According to human face feature points obtained through the human face recognition technology, an angle of head rotation in a previous frame of a human face image and an angle of head rotation in a current frame of human face image are calculated, an angle difference between the two angles is calculated, and in a case that the angle difference exceeds 10 degrees, the expression is determined as a nod.

In step S3, expressions are combined.

The user may combine two expressions as needed. For example, blinking the left eye and opening the mouth are set to be an expression combination, and blinking the right eye and pouting may also be set to be an expression combination.

In step S4, different expression combinations are sorted.

The user may arrange the preset expression combinations in a particular order, and construct a password group according to the sorted expression combinations, for example: expression combination 1 (blink and nod): expression combination 2 (blink the left eye and open the mouth): expression combination 3 (blink and pout): expression combination 4 (smile): expression combination 5 (eyebrow raise): expression combination 6 (goggle).

In step S5, a prompt image and/or animation are set.

For each expression combination, one prompt image or animation that helps in reminding without revealing the expression may be set to help in reminding. For example, a blue sky is set to remember a smile, raining is set to remember an anger, a palm is set to remember a nod, and the like. The associations between the prompt images or animations and expressions is set according to the user's own preferences. The prompts need to be prevented from being excessively distinct, so as to avoid leakage of the password combination.

In step S6, an over-limit protector is set.

For each expression combination, a verification time, such as 5 seconds, is set, and a total quantity of recognition errors is set. For example, after five operations returned with recognition errors, the password lock is be locked and cannot be opened for a period of time, and an early warning information is transmitted to a fixed mailbox and mobile phone number.

In step S7, the terminal is unlocked.

Human face recognition is performed first, and then expression recognition is performed. In a case that an expression corresponding to an unlock node is not known, a prompt image is displayed. After completion of recognition on individual facial expressions, an expression combination is recognized, to determine whether the expression combination corresponding to the corresponding unlock node is correct. After each expression combination is correctly recognized, the entire expression sequence is recognized, to determine whether the order of the expression combinations is correct. Finally, determining of timing out or a cumulative quantity of failures is performed. In a case of timing out or that the cumulative quantity of failures reaches five, the unlocking is suspended and early warning information is transmitted to a fixed mailbox and mobile phone number.

Through the solution of this embodiment, a user can be helped to flexibly set a password combination, for use in achieving access control, file encryption, access to an intelligent terminal operation page and payment, and the like, with a low technical difficulty, a strong privacy, and convenience for operating and remembering.

It is to be understood that, although the steps in the flowcharts of FIG. 2, and FIG. 8 to FIG. 11 are sequentially displayed according to indication of arrows, the steps are not necessarily sequentially performed in the sequence indicated by the arrows. Unless clearly specified in this specification, there is no strict sequence limitation on the execution of the steps, and the steps may be performed in another sequence. In addition, at least some steps in FIG. 2, and FIG. 8 to FIG. 11 may include a plurality of steps or a plurality of stages. The steps or the stages are not necessarily performed at the same moment, and instead may be performed at different moments. The steps or the stages are not necessarily performed sequentially, and instead may be performed in turn or alternately with another step or at least some of steps or stages of the another step.

Figure 17:
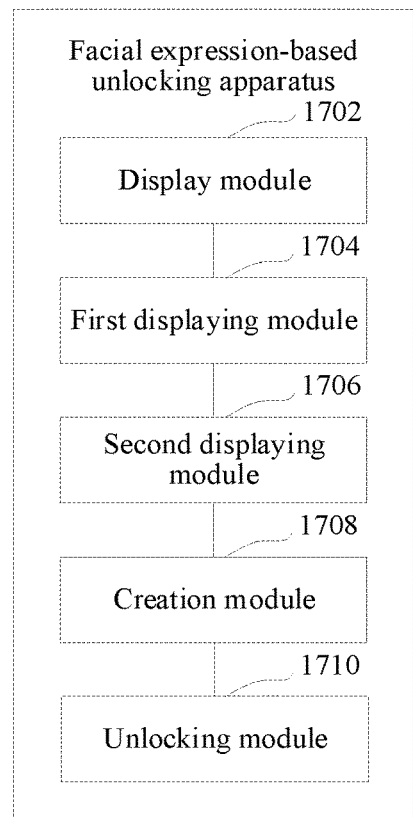
FIG. 17 is a structural block diagram of a facial expression-based unlocking apparatus according to an embodiment.

In an embodiment, as shown in FIG. 17, provided is a facial expression-based unlocking apparatus. The apparatus may be a part of a computer device in a form of a software module or a hardware module, or the combination of the above. The apparatus further includes: a display module 1702, a first displaying module 1704, a second displaying module 1706, a creation module 1708, and an unlocking module 1710. One or more modules of the apparatus can be implemented by processing circuitry, software, or a combination thereof, for example.

The display module 1702 is configured to display an expression unlock page.

The first displaying module 1704 is configured to display an unlock node sequence on the expression unlock page.

The second displaying module 1706 is configured to display, in a face preview area of the expression unlock page, a facial image captured in real time.

The creation module 1708 is configured to create, at a to-be-processed unlock node in the unlock node sequence, an unlock status identification (unlock status notification) based on a facial expression in a facial image captured in real time.

The unlocking module 1710 is configured to complete unlocking based on the unlock status identification and a degree of match between the facial expression in the corresponding facial image and a corresponding target expression.

In the embodiments, the unlock node sequence composed of a plurality of unlock nodes is configured on the expression unlock page, and during unlocking of each unlock node, expression recognition may be performed on a facial image captured in real time; in addition, each unlock node corresponds to a particular target expression, and the whole unlocking process is completed only when the facial expressions in the facial images corresponding to all the unlock nodes match the target expressions corresponding to the unlock nodes. Therefore, unauthorized unlocking implemented by use of an image or a human face model can be effectively avoided and the information security is effectively improved.

In an embodiment, the unlock node sequence is displayed in the unlock progress area of the expression unlock page. The apparatus also includes: a second displaying module, configured to display, in a face preview area of the expression unlock page, a facial image captured in real time; and the creation module, further configured to sequentially perform facial expression recognition on a facial image corresponding to each to-be-processed unlock node in the unlock node sequence in an order of the unlock nodes in the unlock node sequence; and create the unlock status identification at the corresponding unlock node of the unlock progress area each time after the facial expression recognition is completed.

In an embodiment, the apparatus further includes a generation module, a superimposing module, and a determining module.

The generation module is configured to generate an expression model map corresponding to the facial expression each time after the facial expression recognition is completed.

The superimposing module is configured to superimpose and display the expression model map on the corresponding facial image in the face preview area.

The determining module is configured to determine, in response to a determination that the expression model map is consistent with an expression map of a corresponding unlock node, that the facial expression in the facial image matches the corresponding target expression.

In an embodiment, the facial image includes a face and a hand. The apparatus also includes: a recognition module.

The recognition module is configured to perform, in the process of facial expression recognition, gesture recognition on a hand in the facial image.

The creation module is configured to create an unlock status identification at a corresponding unlock node of an unlock progress area after each facial expression recognition and gesture recognition are completed.

In the foregoing embodiment, the facial expression and the gesture recognition are combined for unlocking, which can further improve the security of the unlock node sequence and improve the information security.

In an embodiment, each unlock node corresponds to at least two different target expressions. The creation module is further configured to perform facial expression recognition on at least two facial images corresponding to the to-be-processed unlock node; and in a case that facial expressions in the at least two facial images match corresponding target expressions respectively, create the unlock status identification at the to-be-processed unlock node.

In an embodiment, the determining module is further configured to determine, in a case that the facial expressions in the at least two facial images match the corresponding target expressions respectively, an interval between capture times of the at least two facial images; or, determine an interval between unlock times of the to-be-processed unlock node and a previous processed unlock node.

The creation module is further configured to create, in a case that the interval between the capture times or the interval between the unlock times meets a corresponding time interval condition, the unlock status identification at the to-be-processed unlock node.

In the foregoing embodiment, at least two facial expressions are used for unlocking each unlock node, which can further improve the security of the unlock node sequence and improve the information security.

In an embodiment, the recognition module is further configured to extract eye feature points from the facial image; among the eye feature points, determine a first distance between an upper eyelid feature point and a lower eyelid feature point and determining a second distance between a left eye corner feature point and a right eye corner feature point; and determine an eye portion posture according to a relationship between a ratio of the first distance to the second distance and at least one preset range.

In an embodiment, the recognition module is further configured to extract lip feature points from the facial image; and among the lip feature points, determine a lip portion posture according to a height difference between a lip center feature point and a lip corner feature point; or, among the lip feature points, determine a lip portion posture according to a third distance between an upper lip feature point and a lower lip feature point; and among the lip feature points, determine a lip portion posture according to a relationship between a ratio of the third distance to a fourth distance and at least one preset range. The fourth distance is a distance between a left lip corner feature point and a right lip corner feature point.

In an embodiment, the recognition module is further configured to extract an eyebrow feature point and an eyelid feature point from the facial image; determine a fifth distance between the eyebrow feature point and the eyelid feature point; and determine an eyebrow posture according to a relationship between the fifth distance and a preset distance.

In an embodiment, the face preview area displays a face capture frame. The apparatus also includes: a detection module and a prompt module.

The detection module is configured to determine whether a facial key point in the facial image is located within the face capture frame.

The creation module is further configured to create, at each unlock node and in response to a determination that the facial key point in the facial image is located within the face capture frame, an unlock status identification based on the facial expression in the corresponding facial image in an order of the unlock nodes in the unlock node sequence.

The prompt module is configured to transmit, in a case that the facial key point in the facial image is not located within the face capture frame, prompt information for adjusting a capture orientation.

In an embodiment, the facial image is an image obtained by capturing the to-be-tested object. The recognition module is further configured to sequentially perform human face recognition on the facial image corresponding to each unlock node in the order of the unlock nodes in the unlock node sequence, to obtain a human face recognition result.

The unlocking module is further configured to successfully unlock when (i) an unlock status identification is created at each unlock node, (ii) a facial expression in each facial image matches a corresponding target expression, and, (iii) according to the human face recognition result, it is determined that a to-be-tested object is consistent with a target object.

In the foregoing embodiment, recognition of the facial expression and recognition of the human face are combined for unlocking, which can further improve the security of the unlock node sequence and improve the information security.

In an embodiment, the apparatus also includes: a cancellation module.

The prompt module is further configured to transmit, in response to a determination that the unlock status identification is created at each unlock node in the unlock node sequence, but the facial expression in at least one facial image mismatches the corresponding target expression, prompt information of unlock failure.

The cancellation module is configured to cancel the displaying of the unlock status identification, and return to perform the step of creating, at a to-be-processed unlock node (current unlock mode) in the unlock node sequence, an unlock status identification based on the facial expression in the corresponding facial image.

In an embodiment, the apparatus also includes: an obtaining module, a suspending module, and an alarm module.

The obtaining module is configured to obtain a cumulative quantity of unlock failures in a case that the unlocking fails.

The suspending module is configured to suspend the unlocking process in a case that a cumulative quantity reaches a preset quantity of times.

The alarm module is configured to obtain a reserved communication number and transmit alarm information to the reserved communication number.

In an embodiment, the apparatus further includes: an entry module and a combining module.

The second displaying module is configured to display an expression entry page.

The entry module is configured to sequentially enter, through the expression entry page, expression maps corresponding to expression identifications in the expression entry page.

The entry module is configured to enter an expression combination page.

The combining module is configured to combine, in response to a combined operation triggered on the expression combination page, the expression identifications to obtain an expression unlock sequence.

In an embodiment, the expression unlock page includes an expression prompt area. The second displaying module is further configured to display, in the expression prompt area and in the process of unlocking the to-be-processed unlock node in the unlock node sequence, a prompt image corresponding to the to-be-processed unlock node in response to an expression prompt operation triggered in the expression prompt area.

In the foregoing embodiment, the corresponding expression maps are pre-entered according to the expression identifications, and then the expression identifications are combined and sorted, to generate the expression unlock sequence, so that during unlocking, the expression unlock node is unlocked according to the corresponding facial expression. In addition, during the unlocking of each unlock node, the currently recognized facial expression needs to be compared with the corresponding pre-entered expression map, and the unlocking of the unlock node can be completed only when the currently recognized facial expression matches the corresponding pre-entered expression map; therefore, the security of the unlock node can be effectively improved.

The specific embodiments of the facial expression-based unlocking apparatus may refer to the embodiments of the facial expression-based unlocking method in the foregoing descriptions, which is not repeated herein. The modules in the facial expression-based unlocking apparatus may be implemented in whole or in part by software, hardware, and combinations thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a terminal, and an internal structure diagram thereof may be shown in FIG. 18. The computer device includes a processor (including processing circuitry), a memory, a communication interface, a display, and an input apparatus connected by a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The communication interface of the computer device is used for wired or wireless communication with an external terminal. The wireless mode may be implemented through Wi-Fi, an operator network, Near Field Communication (NFC), or other technologies. The computer program is executed by a processor to implement a facial expression-based unlocking method. The display of the computer device may be a liquid crystal display or an electronic ink display. The input device of the computer device may be a touch layer that overlays the display, or may be a key, a trackball, or a touchpad disposed on the chassis of the computer device, or may be an external keyboard, touchpad or mouse, or the like.

Figure 18:
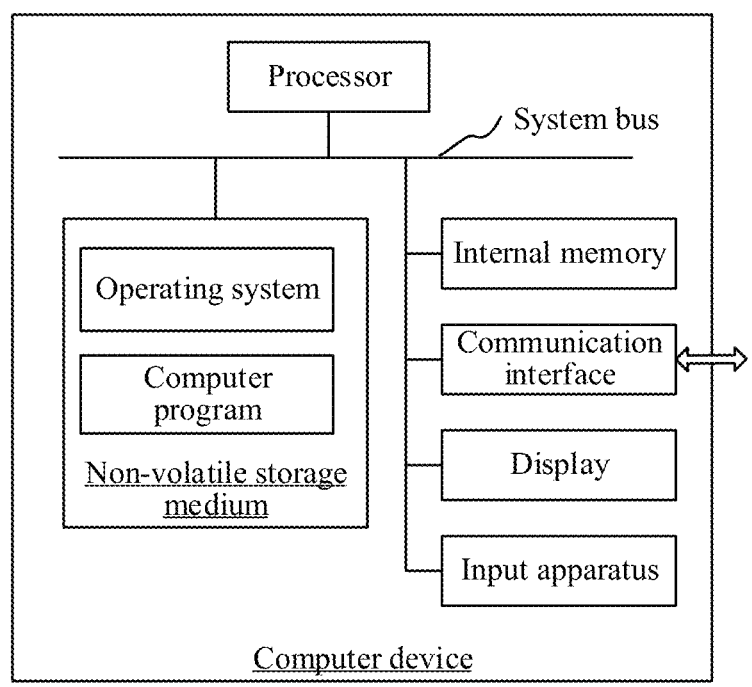
FIG. 18 is an internal structural diagram of a computer device according to an embodiment.

A person skilled in the art may understand that the structure shown in FIG. 18 is only a block diagram of a part of a structure related to a solution of this disclosure and does not limit the computer device to which the solution of this disclosure is applied. Specifically, the computer device may include more or fewer members than those in the drawings, or include a combination of some members, or include different member layouts.

In an embodiment, further provided is a computer device, including a memory and a processor, the memory storing a computer program, and the processor, when executing the computer program, implementing the steps in the foregoing method embodiments.

In an embodiment, provided is a non-transitory computer-readable storage medium, storing a computer program, and the computer program, when being executed by a processor, implementing the steps in the foregoing method embodiments.

In an embodiment, a computer program product or a computer program is provided. The computer program product or the computer program includes a computer instruction. The computer instruction is stored in a computer-readable storage medium. The processor of the computer device reads the computer instruction from the computer-readable storage medium. The processor executes the computer instruction to cause the computer device to perform the steps of the method embodiments.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. Any reference to a memory, a storage, a database, or another medium used in the embodiments provided in this disclosure may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A facial expression-based unlocking method, executed by a terminal, the method comprising:
    displaying an expression unlock page;
    displaying an unlock node sequence on the expression unlock page including a plurality of unlock nodes to be unlocked in a predetermined order, each unlock node corresponding to a different target facial expression, each target facial expression in the unlock node sequence being assigned to a different corresponding unlock node of the plurality of unlock nodes;
    displaying, for each unlock node, a prompt image that is associated with but does not include the corresponding target facial expression;
    determining unlock statuses of the plurality of unlock nodes according to the predetermined order based on whether facial expressions in a plurality of facial images captured in real time in the predetermined order match the different target facial expressions;
    updating a status indicator at each unlock node to indicate successful recognition based on the unlock statuses; and
    completing, by processing circuitry of the terminal, unlocking based on the determined unlock statuses, wherein the unlocking is completed when each unlock node has been unlocked in the predetermined order.

2. The method according to claim 1, wherein
    the unlock node sequence is displayed in an unlock progress area of the expression unlock page; and
    the method further comprises:
        displaying, in a face preview area of the expression unlock page, the plurality of facial images captured in real time;
        sequentially performing facial expression recognition on the plurality of facial images corresponding to each unlock node in the unlock node sequence in the predetermined order; and
        determining the unlock statuses of the respective unlock nodes in the unlock progress area after each facial expression recognition is completed.

3. The method according to claim 2, wherein the method further comprises:
    generating an expression model map for the plurality of facial images corresponding to each unlock node after the facial expression recognition for the respective unlock node is completed;
    superimposing and displaying the expression model map on the corresponding plurality of facial images in the face preview area; and
    in response to a determination that the expression model map is consistent with an expression map of the corresponding unlock node, determining that a facial expression in the plurality of facial images corresponding to the respective unlock node matches the corresponding target expression.

4. The method according to claim 1, wherein
    at least one unlock node of the unlock node sequence corresponds to a target facial expression formed by a combination of at least two sub-expressions; and
    the determining the unlock statuses of the plurality of unlock nodes comprises:
        performing facial expression recognition on at least two facial images corresponding to the at least one unlock node; and
        in response to a determination that facial expressions in the at least two facial images match the at least two sub-expressions in the combination, determining the unlock status of the at least one unlock node as unlocked.

5. The method according to claim 2, wherein the sequentially performing the facial expression recognition comprises:
    sequentially extracting eye feature points from the plurality of facial images corresponding to the respective unlock node in the unlock node sequence;
    among the eye feature points, determining a first distance between an upper eyelid feature point and a lower eyelid feature point and determining a second distance between a left eye corner feature point and a right eye corner feature point; and determining an eye portion posture according to a relationship between a ratio of the first distance to the second distance and at least one preset range.

6. The method according to claim 2, wherein the sequentially performing the facial expression recognition comprises:

sequentially extracting lip feature points from the plurality of facial images corresponding to the respective unlock node in the unlock node sequence; and among the lip feature points, determining a lip portion posture according to a height difference between a lip center feature point and a lip corner feature point; or, among the lip feature points, determining the lip portion posture according to a third distance between an upper lip feature point and a lower lip feature point; or, among the lip feature points, determining the lip portion posture according to a relationship between a ratio of the third distance to a fourth distance and at least one preset range, wherein the fourth distance is a distance between a left lip corner feature point and a right lip corner feature point.

7. The method according to claim 2, wherein the face preview area displays a face capture frame; and after the displaying, in the face preview area of the expression unlock page, the plurality of facial images captured in real time, the method further comprises:

determining whether a facial key point in the plurality of facial images is located within the face capture frame;

in response to a determination that the facial key point is located within the face capture frame, determining the unlock statuses of the respective unlock nodes in the unlock node sequence based on the facial expressions in the plurality of facial images captured in real time; and in response to a determination that the facial key point is not located within the face capture frame, transmitting prompt information for adjusting a capture orientation.

8. The method according to claim 1, wherein the plurality of facial images are images obtained by capturing an object;

the method further comprises:

sequentially performing human face recognition on the plurality of facial images corresponding to each unlock node in the predetermined order, to obtain a human face recognition result; and the completing the unlocking comprises:

in response to a determination that the unlock statuses indicate that each unlock node in the unlock node sequence has been unlocked in the predetermined order, the facial expressions in the plurality of facial images corresponding to each unlock node matching the different target facial expressions, and according to the human face recognition result, determining that the object is consistent with a target object, and completing the unlocking.

9. The method according to claim 1, wherein the method further comprises:

in response to a determination that the unlock statuses have been determined for each unlock node in the unlock node sequence, but the facial expression in at least one facial image corresponding to at least one unlock node mismatches the corresponding target expression, transmitting prompt information of unlock failure; and canceling the determined unlock statuses, and determining the unlock statuses of the plurality of unlock nodes according to the predetermined order based on facial expressions in a new plurality of facial images captured in real time.

10. The method according to claim 9, wherein the method further comprises:

in response to a determination that the unlocking fails, obtaining a cumulative quantity of unlock failures;

in response to a determination that the cumulative quantity reaches a preset quantity of times, suspending an unlocking process; and obtaining a reserved communication number and transmitting alarm information to the reserved communication number.

11. The method according to claim 1, wherein the method further comprises:

displaying an expression entry page;

sequentially entering, through the expression entry page, expression maps corresponding to expression identifications in the expression entry page;

entering an expression combination page; and in response to an operation triggered on the expression combination page, combining the expression identifications to obtain an expression unlock sequence.

12. The method according to claim 1, wherein the expression unlock page comprises an expression prompt area; and the method further comprises:

when determining unlock statuses of the plurality of unlock nodes according to the predetermined order, displaying, in the expression prompt area, a prompt image corresponding to an unlock node of the plurality of unlock nodes being processed in response to an expression prompt operation triggered in the expression prompt area.

13. The method according to claim 2, wherein the plurality of facial images comprise a face and a hand; the method further comprises:

in the facial expression recognition, performing gesture recognition on the hand in the plurality of facial images; and the determining the unlock statuses comprises:

determining the unlock statuses of the respective unlock nodes being processed in the unlock progress area after each facial expression recognition and gesture recognition are completed.

14. The method according to claim 4, wherein the method further comprises:

in response to a determination that the facial expressions in the at least two facial images match the at least two sub-expressions in the combination, determining an interval between capture times of the at least two facial images; or determining an interval between unlock times when the unlock statuses of the at least one unlock node and a previously processed unlock node are determined; and in response to a determination that the interval between the capture times or the interval between the unlock times meets a corresponding time interval condition, determining the unlock status of the at least one unlock node as unlocked.

15. The method according to claim 2, wherein the sequentially performing the facial expression recognition comprises:
sequentially extracting an eyebrow feature point and an eyelid feature point from the plurality of facial images corresponding to each unlock node in the unlock node sequence;
determining a fifth distance between the eyebrow feature point and the eyelid feature point; and
determining an eyebrow posture according to a relationship between the fifth distance and a preset distance.

16. A facial expression-based unlocking apparatus, the apparatus comprising:
processing circuitry configured to:
display an expression unlock page;
display an unlock node sequence on the expression unlock page including a plurality of unlock nodes to be unlocked in a predetermined order, each unlock node corresponding to a different target facial expression, each target facial expression in the unlock node sequence being assigned to a different corresponding unlock node of the plurality of unlock nodes;
display, for each unlock node, a prompt image that is associated with but does not include the corresponding target facial expression;
determine unlock statuses of the plurality of unlock nodes according to the predetermined order based on whether facial expressions in a plurality of facial images captured in real time in the predetermined order match the different target facial expressions;
update a status indicator at each unlock node to indicate successful recognition based on the unlock statuses; and
complete unlocking based on the determined unlock statuses, wherein the unlocking is completed when each unlock node has been unlocked in the predetermined order.

17. The apparatus according to claim 16, wherein
the unlock node sequence is displayed in an unlock progress area of the expression unlock page; and
the processing circuitry is further configured to:
display, in a face preview area of the expression unlock page, the plurality of facial images captured in real time;
sequentially perform facial expression recognition on the plurality of facial images corresponding to each unlock node in the unlock node sequence in the predetermined order; and
determine the unlock statuses of the respective unlock nodes in the unlock progress area after each facial expression recognition is completed.

18. The apparatus according to claim 17, wherein the processing circuitry is further configured to:
generate an expression model map for the plurality of facial images corresponding to each unlock node after the facial expression recognition for the respective unlock node is completed;
superimpose and display the expression model map on the corresponding plurality of facial images in the face preview area; and
determine, in response to a determination that the expression model map is consistent with an expression map of the corresponding unlock node, that a facial expression in the plurality of facial images corresponding to the respective unlock node matches the corresponding target expression.

19. The apparatus according to claim 16, wherein
at least one unlock node of the unlock node sequence corresponds to a target facial expression formed by a combination of at least two sub-expressions; and
the processing circuitry is further configured to:
perform facial expression recognition on at least two facial images corresponding to the at least one unlock node; and
in response to a determination that facial expressions in the at least two facial images match the at least two sub-expressions in the combination, determining the unlock status of the at least one unlock node as unlocked.

20. A non-transitory computer-readable storage medium, storing a computer program, which, when executed by a processor, causes the processor to perform a facial expression-based unlocking method, the method comprising:
displaying an expression unlock page;
displaying an unlock node sequence on the expression unlock page including a plurality of unlock nodes to be unlocked in a predetermined order, each unlock node corresponding to a different target facial expression, each target facial expression in the unlock node sequence being assigned to a different corresponding unlock node of the plurality of unlock nodes;
displaying, for each unlock node, a prompt image that is associated with but does not include the corresponding target facial expression;
determining unlock statuses of the plurality of unlock nodes according to the predetermined order based on whether facial expressions in a plurality of facial images captured in real time in the predetermined order match the different target facial expressions;
updating a status indicator at each unlock node to indicate successful recognition based on the unlock statuses; and
completing unlocking based on the determined unlock statuses, wherein the unlocking is completed when each unlock node has been unlocked in the predetermined order.

* * * * *